US011226250B2

(12) United States Patent
Mamigonians et al.

(10) Patent No.: US 11,226,250 B2
(45) Date of Patent: Jan. 18, 2022

(54) SENSING APPARATUS

(71) Applicant: Zedsen Limited, London (GB)

(72) Inventors: Hrand Mami Mamigonians, London (GB); Aslam Sulaimalebbe, Cardiff (GB)

(73) Assignee: Zedsen Limited, London (GB)

( * ) Notice: Subject to any disclaimer, the term of this patent is extended or adjusted under 35 U.S.C. 154(b) by 161 days.

(21) Appl. No.: 16/701,435

(22) Filed: Dec. 3, 2019

(65) Prior Publication Data

US 2020/0103298 A1 Apr. 2, 2020

Related U.S. Application Data

(63) Continuation-in-part of application No. PCT/GB2018/000089, filed on May 31, 2018.

(30) Foreign Application Priority Data

Jun. 3, 2017 (GB) ..................................... 1708895

(51) Int. Cl.
*G01L 9/00* (2006.01)
*G01L 19/08* (2006.01)
(Continued)

(52) U.S. Cl.
CPC .......... *G01L 9/0072* (2013.01); *G01L 9/0005* (2013.01); *G01L 19/083* (2013.01);
(Continued)

(58) Field of Classification Search
CPC ... G01L 9/0072; G01L 9/0005; G01L 19/083; G01L 27/005; G01L 15/00; G01L 1/146;
(Continued)

(56) References Cited

U.S. PATENT DOCUMENTS

2004/0104727 A1\* 6/2004 Morimoto ............ G01D 5/2417
324/409
2006/0012944 A1\* 1/2006 Mamigonians ...... H03K 17/975
361/303

(Continued)

FOREIGN PATENT DOCUMENTS

FR 3001800 A1 8/2014
GB 2488600 A \* 9/2012 ............. G01L 1/142
(Continued)

OTHER PUBLICATIONS

Corresponding International Patent Application No. PCT/GB2018/000089, International Search Report and Written Opinion, dated Aug. 27, 2018.

*Primary Examiner* — Jonathan M Dunlap
(74) *Attorney, Agent, or Firm* — Cooper Legal Group, LLC

(57) ABSTRACT

An apparatus comprises an electrically active layer having a first plurality of substantially parallel electrodes and a second plurality of substantially parallel electrodes, wherein the first plurality of electrodes are not parallel to the second plurality of electrodes, such that there exists a matrix of intersection points between the electrodes. A signal generator is configured to generate excitation signals and is connected to the first plurality of electrodes, and a signal detector is configured to detect output signals from the second plurality of electrodes, wherein an output signal from one of the second plurality of electrodes is indicative of the degree of capacitive coupling to one of the first plurality of electrodes on application of an excitation signal thereto. A flexible top layer is sealed to the electrically active layer to define at least one hermetic void between portions of the top layer and portions of the electrically active layer.

20 Claims, 22 Drawing Sheets

(51) Int. Cl.
*G01L 27/00* (2006.01)
*G06F 3/044* (2006.01)
*G01L 23/12* (2006.01)
*G01L 15/00* (2006.01)
*G01L 1/14* (2006.01)

(52) U.S. Cl.
CPC ............ *G01L 27/005* (2013.01); *G01L 1/144* (2013.01); *G01L 1/146* (2013.01); *G01L 15/00* (2013.01); *G01L 23/125* (2013.01); *G06F 3/0445* (2019.05); *G06F 3/0446* (2019.05); *G06F 3/0447* (2019.05); *G06F 2203/04107* (2013.01)

(58) Field of Classification Search
CPC ..... G01L 1/144; G01L 23/125; G06F 3/0447; G06F 3/0446; G06F 3/0445; G06F 2203/04107
See application file for complete search history.

(56) References Cited

U.S. PATENT DOCUMENTS

| | | | |
|---|---|---|---|
| 2008/0202251 | A1* | 8/2008 | Serban ................. H03K 17/962 73/780 |
| 2012/0222496 | A1* | 9/2012 | Mamigonians ........ B60N 2/002 73/862.68 |
| 2012/0223723 | A1* | 9/2012 | Mamigonians ......... G01L 1/142 324/649 |
| 2016/0026297 | A1 | 1/2016 | Shinkai et al. |
| 2016/0272487 | A1 | 9/2016 | Sato |
| 2017/0146334 | A1 | 5/2017 | Germann et al. |

FOREIGN PATENT DOCUMENTS

| | | |
|---|---|---|
| JP | 2014142193 A | 8/2014 |
| WO | 2012010303 A1 | 1/2012 |
| WO | 2015048584 A1 | 4/2015 |

* cited by examiner

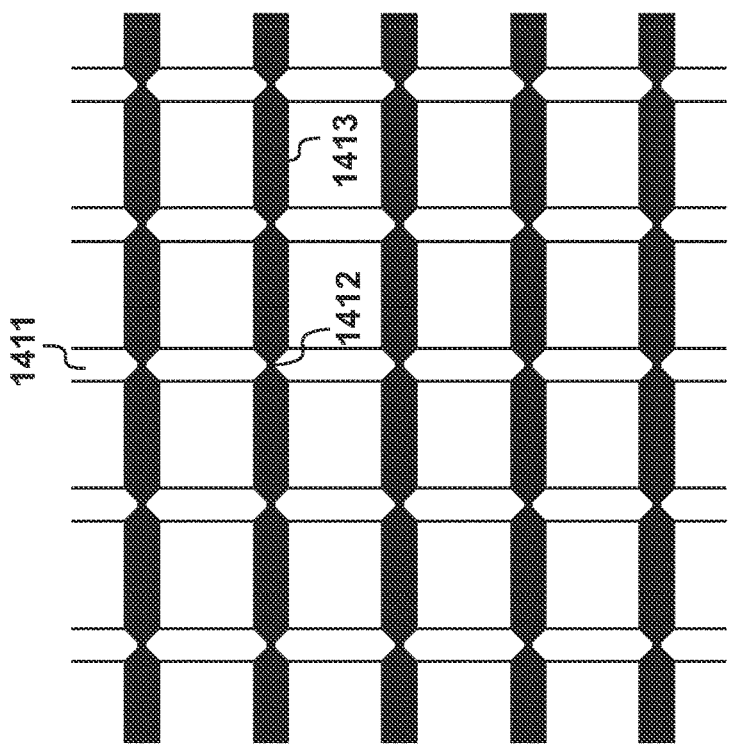
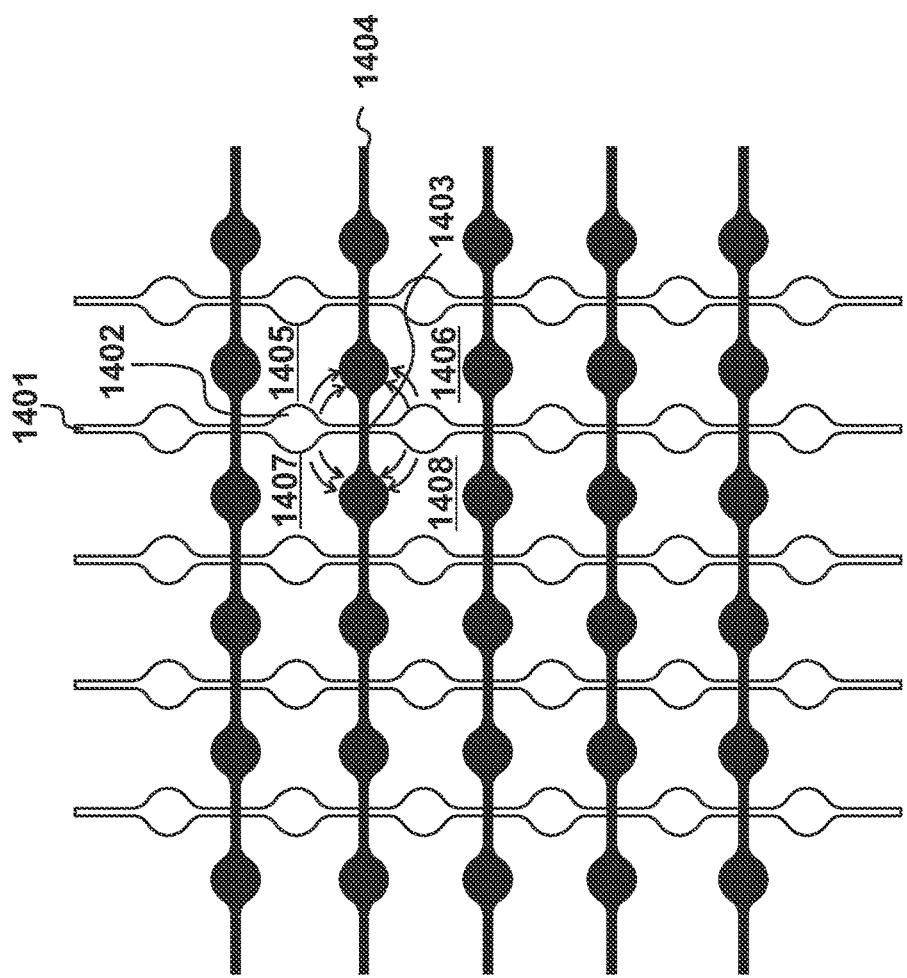
Fig. 14b
Fig. 14a

SENSING APPARATUS

CROSS REFERENCE TO RELATED APPLICATIONS

This application claims priority from and is a continuation-in-part of International Patent Application No. PCT/GB2018/000089, filed on 31 May 31 2018, which claims priority from United Kingdom Patent Application 1708895.6, filed on 3 Jun. 2017. The entire contents of International Patent Application No. PCT/GB2018/000089 and United Kingdom Patent Application 1708895.6 are incorporated herein by reference.

BACKGROUND OF THE INVENTION

The present invention relates to an apparatus for sensing changes in air pressure and in pressure applied directly to the apparatus.

It is often necessary to measure the air pressure around an object, particularly in the field of aerodynamics. For example, the design of an aerofoil requires understanding of the airflow around it, so that the lower pressure above the aerofoil creates lift. Similarly, in the design of cars it is essential to understand which parts of the car are causing lift, drag or turbulence.

It is therefore known to provide sensors to measure air pressure at various places on an object, particularly in a wind tunnel. One such method uses tubes connected at one end to surface taps (small holes) in the object, and at the other end to pressure transducers, often located outside the wind tunnel. There are considerable disadvantages with this method, for example the need to drill holes at precise points on the object, and the need to route the pressure tubes without placing strain on them. Further, this method can only be used with models in a wind tunnel, rather than with the genuine article. For example, it is not possible to use this method with a moving car in order to measure drag in the real world.

A second known method is the use of pressure-sensitive paints, which fluoresce under a specific illumination wavelength in differing intensities depending upon the air pressure being applied. This is easier to apply than the pressure taps but relies on accurate photography of the paint to provide pressure measurements. Further, it can only be used in specific environments that have the required light, and therefore cannot be used in the real world.

A third known method is computational fluid dynamics, which uses a computer to mathematically model the air flow around the object. While this is useful in the design stage, it cannot provide real world information.

There is therefore a need for an air pressure sensor that is easy to apply to an object and can be used on a moving object as well as in a wind tunnel.

Further, it would be advantageous if such a sensor were also able to sense pressure applied directly to it.

French Patent Application No. 3 001 800 discloses a sensor having a lower part integrating conductive and coplanar lower electrodes and an upper part integrating a flexible, conducting and floating upper electrode. Spacer abutments intercalated between the parts maintain spacing between them. The upper electrode is positioned with respect to the lower electrodes at a predetermined distance. The lower electrodes include conductive ink layers deposited on an upper face of a lower substrate. The upper electrode has a conductive ink layer deposited on a lower face of an upper substrate.

Japanese Patent Application No. 2014142193 discloses a load distribution detector capable of performing highly accurate detection regardless of application even with a simple configuration. A load distribution detector includes a plurality of fixed electrodes arrayed along a detection plane, movable electrodes provided in a manner to face the fixed electrodes, a plurality of capacitance detection parts constituted by pairs of the fixed electrodes and the movable electrodes, and a screening electrode provided on the side of the fixed electrodes relative to the movable electrodes. The fixed electrodes which abut each other in a predetermined direction are electrically connected.

Neither of these sensors can be used to sense pressure applied to it.

SUMMARY OF THE INVENTION

According to a first aspect of the invention, there is provided an apparatus comprising an electrically active layer having a first plurality of substantially parallel electrodes and a second plurality of substantially parallel electrodes, wherein said first plurality of electrodes are not parallel to said second plurality of electrodes, such that there exists a matrix of intersection points between said electrodes; a signal generator configured to generate excitation signals and connected to said first plurality of electrodes; a signal detector configured to detect output signals from said second plurality of electrodes, wherein an output signal from one of said second plurality of electrodes is indicative of the degree of capacitive coupling to one of said first plurality of electrodes on application of an excitation signal thereto; and a flexible top layer sealed to said electrically active layer to define at least one hermetic void between portions of said top layer and portions of said electrically active layer; such that at least one sensor is defined, each sensor containing only one of said hermetic voids and comprising a moveable layer and a fixed layer, being respectively the portion of the top layer and the portion of the electrically active layer that define said hermetic void; wherein for each sensor: said fixed layer comprises one of said intersection points; at least a part of said moveable layer is configured to be selectively grounded; and while said part of said moveable layer is grounded, the degree of capacitive coupling between the pair of electrodes that intersect at said intersection point is indicative of the movement of said part of said moveable layer towards or away from said fixed layer.

According to a second aspect of the invention, instead of said fixed layer comprising one of said intersection points, said fixed layer comprises an area that is in a cell bounded by a plurality of said intersection points, and it is the degree of capacitive coupling between pairs of intersecting electrodes bounding said area that is indicative of the movement.

According to a third aspect of the invention, there is provided, in an apparatus comprising an electrically active layer having a first plurality of substantially parallel electrodes and a second plurality of substantially parallel electrodes, a method comprising the steps of: generating an excitation signal and applying it to a first electrode, being one of said first plurality of electrodes; detecting an output signal from a second electrode, being one of said second plurality of substantially parallel electrodes, and said output signal being indicative of the degree of capacitive coupling to said first electrode on application of said excitation signal, wherein: said first plurality of electrodes are not parallel to said second plurality of electrodes, such that there exists a matrix of intersection points between said electrodes, and a flexible top layer is attached to said electrically active layer to define a hermetic void covering an area, wherein said area contains the intersection point of a pair of electrodes, and said flexible top layer is grounded in at least a part of said top layer that overlays said area; and using said output signal, calculating the amount of movement of said top layer towards or away from said electrically active layer.

According to a fourth aspect of the invention, instead of said area containing one of said intersection points, said area is in a cell bounded by a plurality of said intersection points.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

Components and processes distinguished by ordinal phrases such as "first" and "second" do not necessarily define an order or ranking of any sort.

BRIEF DESCRIPTION OF THE SEVERAL VIEWS OF THE DRAWINGS

FIG. 14a is an example of design of electrodes shown in FIG. 13;

FIG. 14b is an alternative example of design of electrodes shown in FIG. 13;

DETAILED DESCRIPTION OF EMBODIMENTS OF THE INVENTION

FIG. 1

Figure 1:
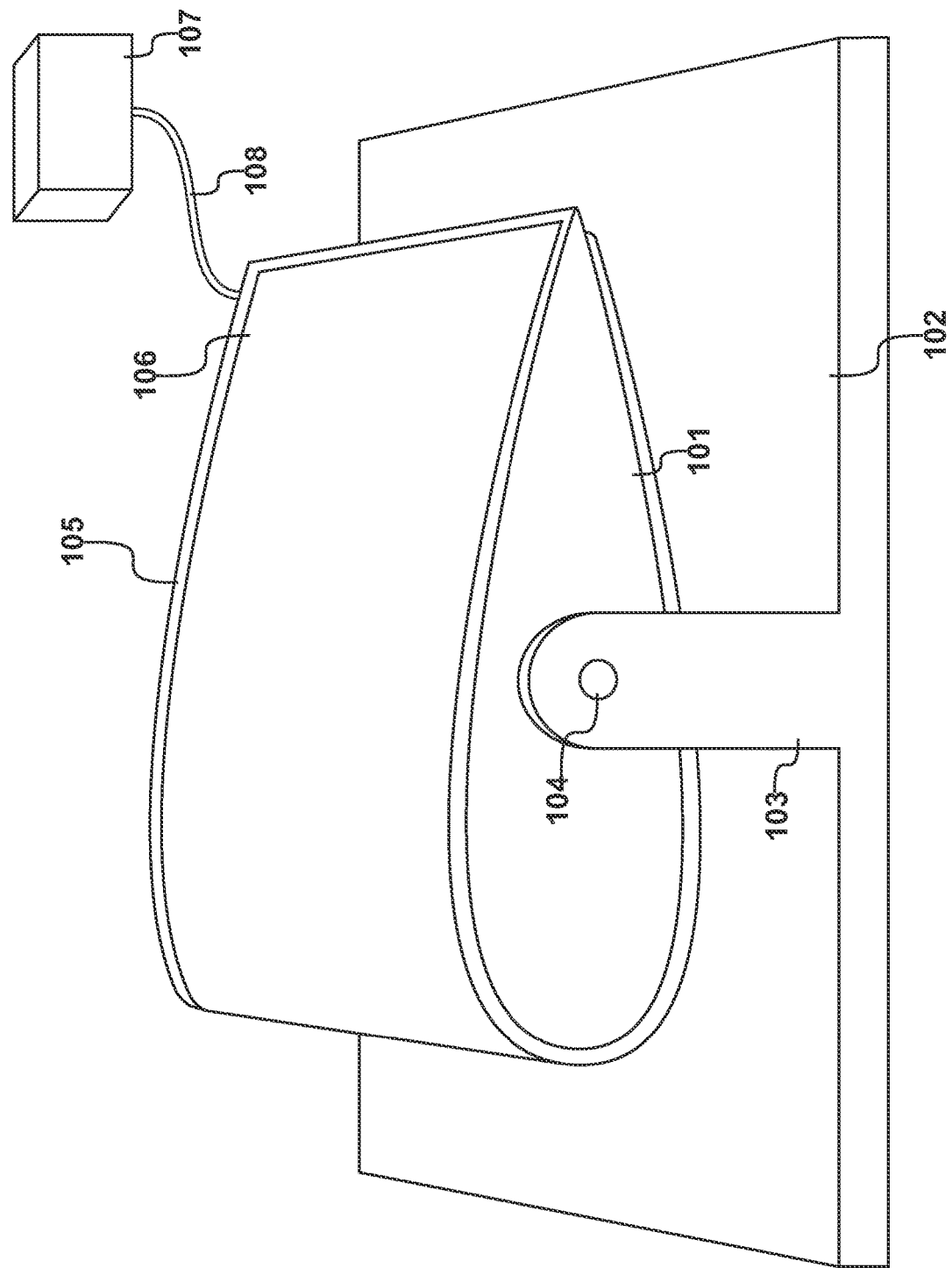
FIG. 1 illustrates sensing apparatus according to the invention.

FIG. 1 illustrates a model aerofoil 101 that is to be placed in a wind tunnel in order to measure the air flow around it. Aerofoil 101 is mounted on a base 102 using a bracket 103, to which it is pivotally mounted using bolt 104. A further bracket and bolt (not shown) are on the other side of the aerofoil.

Air pressure around the aerofoil is measured by air pressure sensing apparatus 105. This comprises a sensor pad 106 wrapped around and attached to the aerofoil, and a control until 107 connected via a cable 108 to sensor pad 106. During testing, an engineer may tilt the model aerofoil on the bracket in order to test the differences in air pressure measurements at different angles, as is usual when designing aerofoils. An advantage of sensor 105 is that the pad is simply wrapped around the aerofoil and can easily be removed and used on another model. This allows quick testing of different shapes.

Further, because the sensor pad can be easily attached to any object and the control unit is not large, the sensor can be used on moving objects, for example a flying aeroplane, rather than just inside a wind tunnel.

The measurements generated by the sensor can either be immediately output to a computing device for instant display or stored within the control unit for later download.

The sensing apparatus can also be used to measure pressure exerted by any gas or fluid, with suitable modifications for protection against fluid ingress.

FIG. 2

Figure 2:
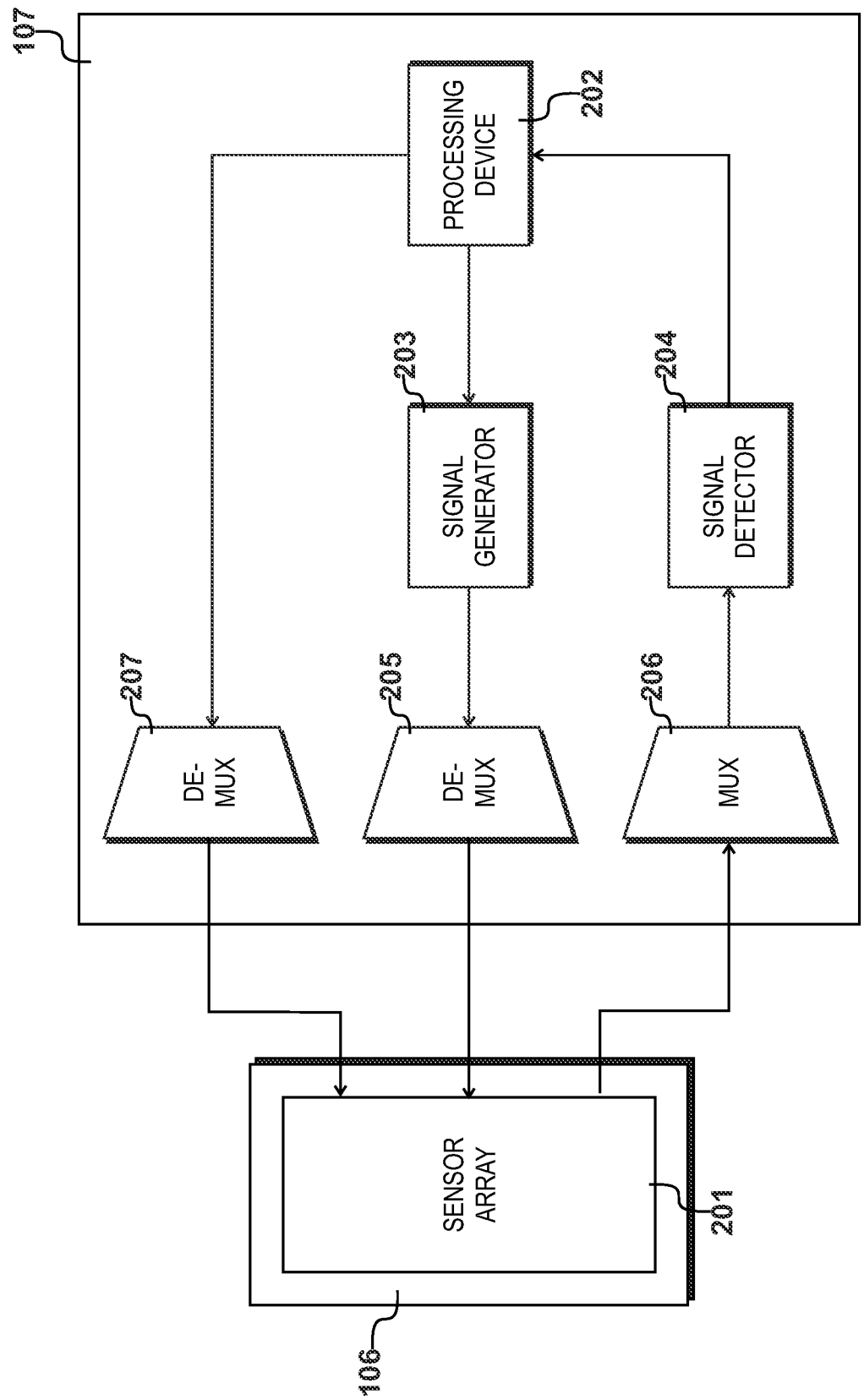
FIG. 2 is a block diagram of functional components making up the sensing apparatus shown in FIG. 1.

A block diagram of functional components making up air pressure sensing apparatus 105 is shown in FIG. 2.

Sensor pad 106 primarily includes a sensor array 201, which includes a plurality of coplanar electrodes that experience a degree of capacitive coupling between each other. Sensor array 201 further includes a plurality of ground electrodes. Sensor array 201 will be described in further detail with reference to FIG. 4, and its principle of operation will be described further with reference to FIGS. 9 to 11.

Sensor pad 106 may also include some degree of padding, such as a foam backing, in order to provide some protection against bumps. It may also include means for attaching the pad to an object, such as adhesive strips or tie points.

The control unit 107 includes a processing device 202, a signal generator 203, a signal detector 204, a demultiplexer 205 and a multiplexer 206. Demultiplexer 205 couples signal generator 203 to the inputs of sensor array 201, and multiplexer 206 couples the outputs of sensor array 201 to signal detector 204.

The control unit 107 further includes a demultiplexer 207 that couples processing device 202 to the ground electrodes in sensor array 201, in order to selectively operate them.

Thus, in use, the sensor 105 is operative to generate excitation signals by the signal generator 203 which are applied to electrodes in the sensor array 201 under control of the processing device 202. Outputs from electrodes in the sensor array 201 are received at the signal detector 204 and are processed by the processing device 202 to give a measurement of air pressure, as will be described further with reference to FIG. 11.

FIG. 3

Figure 3:
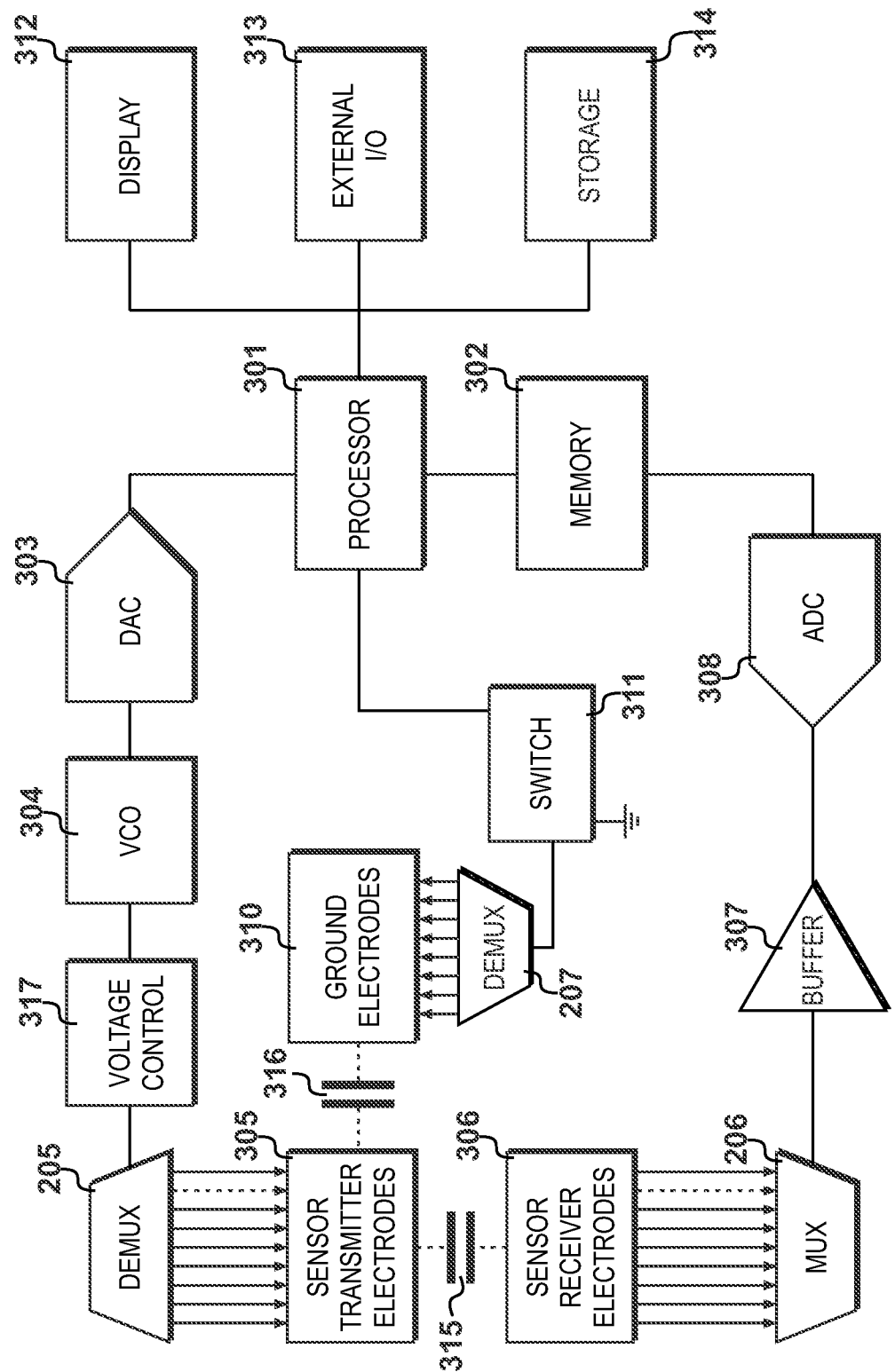
FIG. 3 is a block diagram of components making up the sensing apparatus shown in FIG. 1.

A practical realisation of the air pressure sensing apparatus 105 is shown in FIG. 3.

The processing device 202 includes a processing core 301 for executing program instructions, and memory 302 for storing those program instructions along with data to be processed and data that has been processed. The processing core 301 is coupled, via a digital-to-analog converter 303, to a voltage-controlled-oscillator (VCO) 304, which provides the functionality of the signal generator 203. In practice, temperature compensation and frequency control of the VCO 304 may be provided, or, as in the present case, a monolithic VCO may be provided which provides such functionality on-die. The VCO is in the present embodiment configured to generate a square wave at a frequency of 20 kilohertz. Other waveforms may be used, such as sinusoids or triangle waves, with, as will be known to those skilled in the art, VCOs being able to be programmed to produce any one of a number of waveforms.

The output of the VCO 304 is provided to a voltage control circuit 317 before being switched by the demultiplexer 205 across the sensor transmitter electrodes 305. The switching rate of the demultiplexer 205 depends upon the mode of operation of the sensing apparatus 105.

Capacitive coupling between transmitter electrodes 305 and the sensor's receiver electrodes 306 occurs upon application of the generated waveform to the transmitter electrodes, as illustrated by capacitance symbol 315. In addition, capacitive coupling occurs between transmitter electrodes 305 and ground electrodes 310, as illustrated by capacitance symbol 316. The proximity of ground electrodes 310 to transmitter electrodes 305 therefore affects the amount of capacitive coupling between transmitter electrodes 305 and receiver electrodes 306, and this concept forms the basis for the sensing apparatus 105. Voltage control circuit 317 varies the voltage provided to the electrodes in order to provide fine control of the amount of capacitive coupling occurring.

Some capacitive coupling may also occur between receiver electrodes 306 and ground electrodes 310, which is not shown in this Figure.

Demultiplexer 205 switches between transmitter electrodes and multiplexer 206 switches between receiver electrodes 306 to allow measurement of the degree of capacitive coupling between particular ones of the transmitter and receiver electrodes. Simultaneously, demultiplexer 207 provides signals to ground electrodes 310, which may be open, have a hard ground or a soft ground, or have another signal such as a positive charge. The provided signal is determined by switch 311, which is controlled from processor 301.

The output signals from the multiplexer 206 are coupled via a buffer amplifier 307 (that may have a gain of unity or may provide some amplification, depending on the application) to a 24-bit, 96 kilohertz sigma-delta analog-to-digital converter 308, which provides the functionality of the signal detector 204. A 24-bit resolution provides a high dynamic range, whilst a sample rate of 96 kilohertz assists in avoiding aliasing of the output signals from the sensor array 201.

The output waveforms sampled by the analog-to-digital converter 308 are written to memory 302 for subsequent processing by the processing core 301.

In the present embodiment, the control unit 107 includes a display 312, indicating the status of the sensor and allowing for user configuration. In the present example, the internal display is a low power draw liquid crystal display configured to display numeric characters, but in alternative embodiments a higher resolution dot matrix liquid crystal display could be provided should further functionality wish to be incorporated into the sensor.

In the present embodiment the control unit 107 also includes an external I/O device 313 which, in this specific example, provides wireless connectivity using the Bluetooth® protocol. In this way, data collected by the sensor may be conveyed to connected devices for real-time display or for storage. In a contemplated embodiment, the external I/O device 311 may also or alternatively provide wireless network connectivity using an IEEE 802.11-type protocol. Further, the external I/O device 311 could be specified to provide wired connectivity via a suitable wired protocol such as Universal Serial Bus®. I/O device also allows for user configuration of the apparatus.

The control unit 107 finally includes storage 314, which may be used to store data collected by the apparatus for later download, if the control unit is not connected to another device while the sensor is in use.

In the present implementation, the processing core 301, memory 302, DAC 303 and ADC 308 are all incorporated within one microcontroller, such as an ADuC7060 available from Analog Devices, Inc. of Norwood, Mass., USA.

FIG. 4

Figure 4:
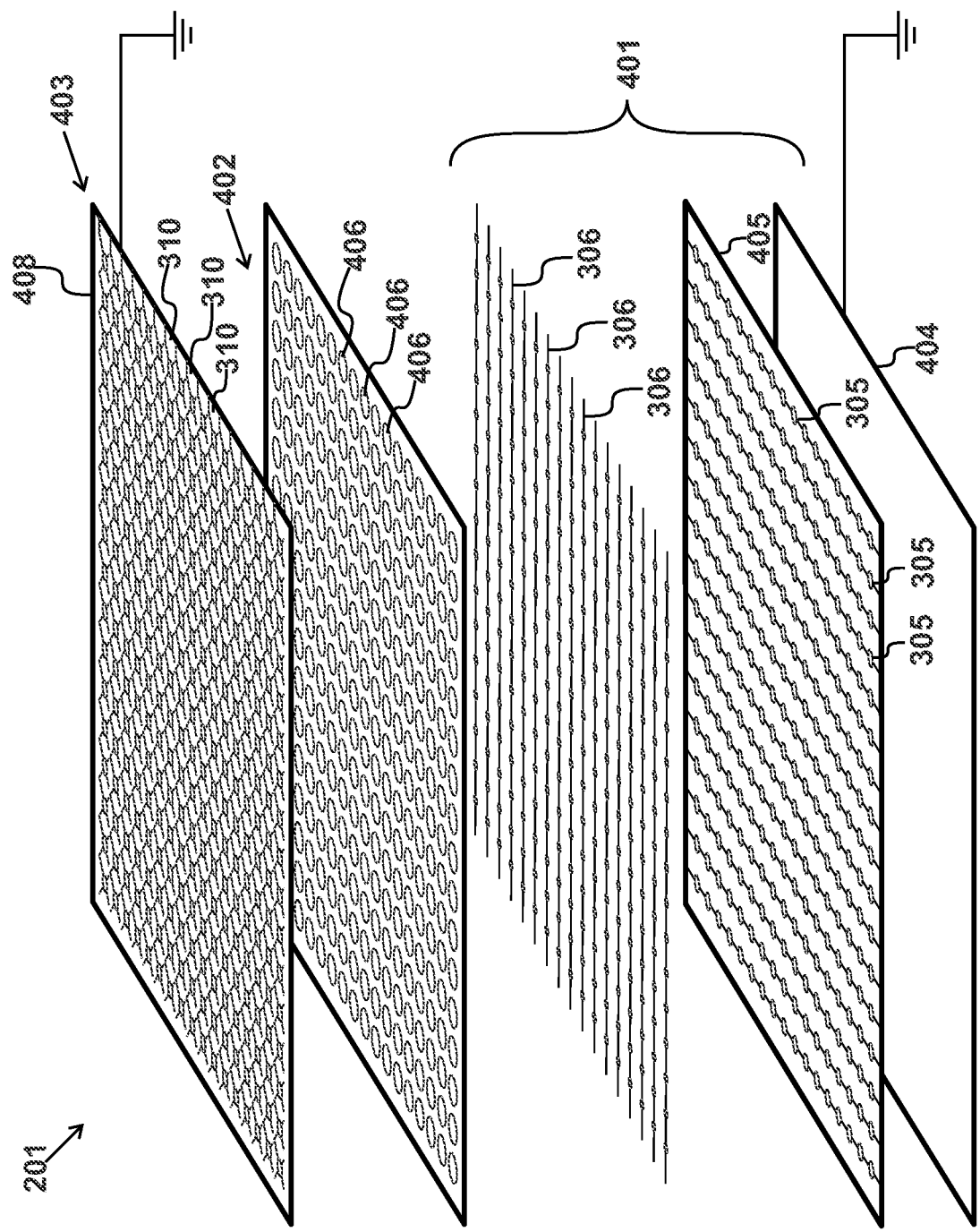
FIG. 4 is an exploded diagram of a sensor array shown in FIG. 2.

FIG. 4 is an exploded diagram of sensor array 201. It comprises four layers, electrically active layer 401, spacer layer 402, top ground layer 403, and ground plate 404.

Electrically active layer 401 comprises a plurality of transmitter electrodes 305, and a plurality of receiver electrodes 306. Each transmitter electrode is a series of circles connected by straight lines. Each receiver electrode is a series of smaller circles, connected by straight lines orthogonal to the transmitter electrodes. The connections from the electrodes to control unit 107 are not shown in this figure. In this embodiment the distance between adjacent electrodes is 10 mm; however, this can be varied depending upon the resolution required.

In this illustration the sensor pad 106 is a 17×17 matrix of sensors, providing 289 discrete points where the air pressure can be measured. However, the sensor pad can be as large or small as is required for the application. Layer 401 also includes a membrane 405 onto which the electrodes are, in this embodiment, printed using conductive ink containing, for example, indium-tin-oxide, graphene, copper, or silver. In addition, the membrane may be rigid or flexible depending upon the application. In this embodiment the transmitters 305 and the receivers 306 are printed on the same side of the membrane. In other embodiments they could be on separate membranes or on either side of a single membrane.

Spacer layer 402 is a layer of material that defines a plurality of holes 406 open at both ends. These holes line up with the grid created by the electrodes 305 and 306 so that each hole covers an intersection between electrodes. Spacer layer 402 is attached to electrically active layer 401 to create an airtight seal. In this embodiment spacer layer 402 is adhered to electrically active layer 401, but other methods could be used.

In this embodiment spacer layer 402 is 0.5 mm thick and made from soft silicon, but any suitable material could be used, preferably non-conductive. For example, if the sensor pad 106 were likely to be subjected to very high winds, then a harder material would be more suitable, in order to avoid over-compressing the spacer layer. Additionally, the spacer layer could be any suitable thickness that provides enough separation between top layer 403 and electrically active layer 401 to obtain useable results from the sensor array 201. This will be discussed further with respect to FIGS. 6 to 8.

Top ground layer 403 comprises a plurality of ground electrodes 310 printed in parallel on a flexible membrane 408 (similarly to electrodes 305 and 306). In this embodiment, each ground electrode comprises a plurality of circles connected together. The ground electrodes may be printed on either or both sides of the membrane. Each circle lines up with one of the holes in spacer layer 402. Ground electrodes 310 are connected to switch 311 via demultiplexer 207, and may each be grounded, open, or have another signal. Top ground layer 403 is attached to spacer layer 402 to create an airtight seal. In this example the layers are adhered together, but another method could be used.

Membrane 408 is flexible enough to allow it to move under changes in air pressure. In this embodiment it is made from polyester but other suitable flexible and non-conductive materials could be used. For example, a more robust material such as polyamide could be used if the sensor pad 106 were to be exposed to very high or low temperatures. In this embodiment membrane 408 is 0.1 mm thick, but this can vary according to the requirements.

Ground plate 404 is provided below the electrically active layer 401 to electromagnetically shield the electrodes, particularly from the effects of stray capacitance. It is to be appreciated that reference to electrical "ground" and an element being electrically "grounded" in this description encompass both the case of being physically connected to Earth or to a current carrying body capable of providing a zero-voltage reference level. Thus, the term "ground" as used herein refers to the general case of a body that can be approximated as capable of providing an infinite source of and sink for charge and can thus absorb an unlimited amount of current without a change in potential of the element connected to it. The term "ground" also refers to a "soft ground" where the grounded element is connected to a resistor. This option allows the amount of grounding to be tailored according to the required configuration.

In this embodiment, any of the above grounding options may be used for the ground electrodes 310 and ground plate 404. In other embodiments, the ground plate 404 may be omitted.

FIG. 5

Figure 5:
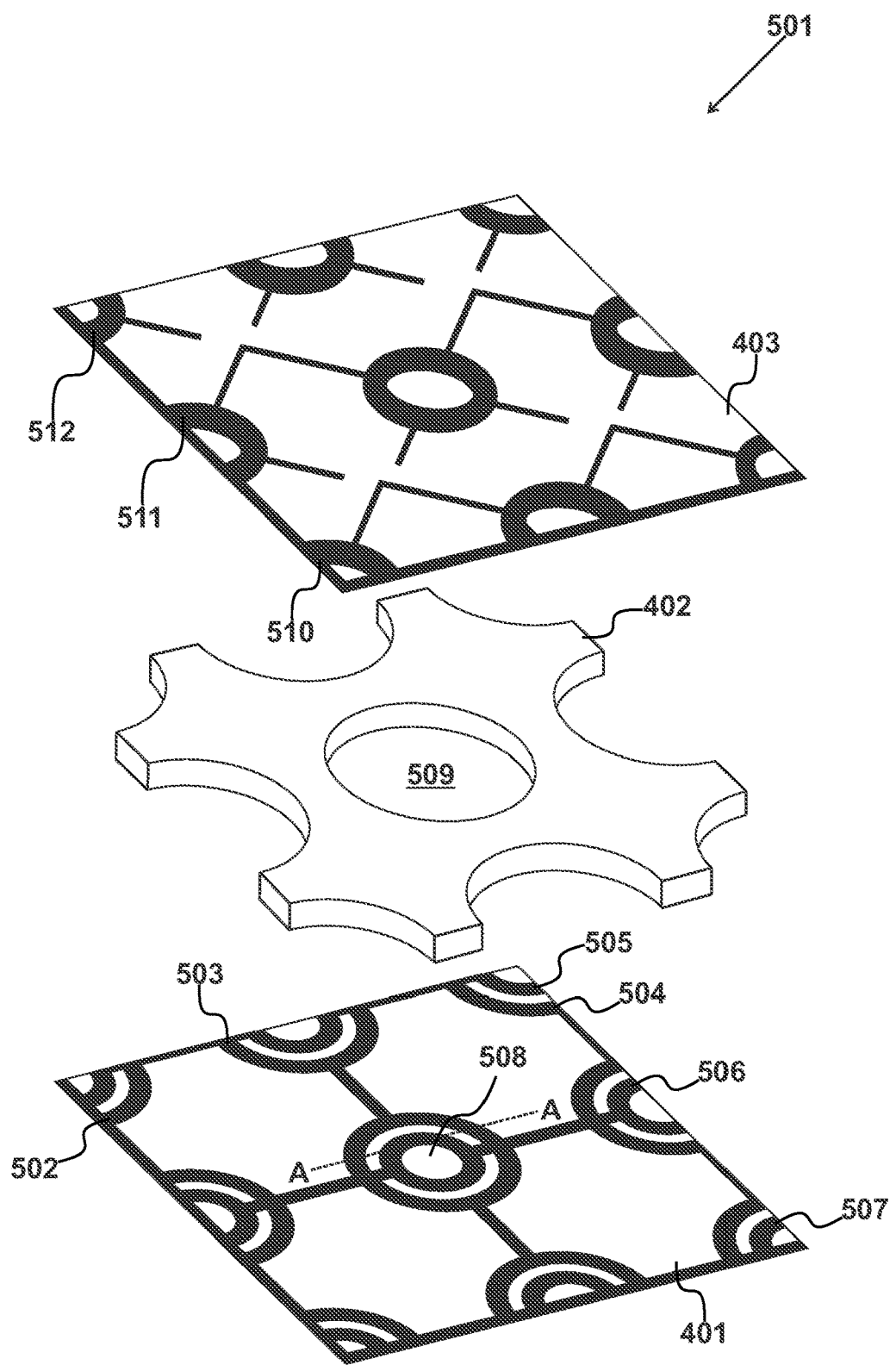
FIG. 5 is an exploded diagram of a sensor shown in FIG. 4.

The sensor array 201 shown in FIG. 4 provides a matrix of individual sensors, each one comprising a ground electrode separated from an intersection of transmitter and receiver electrodes in the electrically active layer by a void created by a hole in spacer layer 402. An exploded diagram of a single sensor 501 is shown in FIG. 5. (Ground plate 404 is not shown in this diagram.)

Layer 401 is shown as a single layer, with transmit electrodes 502, 503 and 504 orthogonal to receive electrodes 505, 506 and 507. At each intersection of transmit and receive electrodes, the small circle of the receive electrode is contained within the large circle of the transmit electrode. The intersection 508 of electrodes 503 and 506 forms the base of the single sensor 501.

The hole 509 in spacer layer 402 is, in this embodiment, larger than the large circle of transmit electrode 503. The material of spacer layer 402 is sealed to electrically active layer 401 around the intersection 508.

Top ground layer 403 has ground electrodes 510, 511 and 512. Each is a series of circles joined by a line. In this example each joining line between a pair of circles is formed as a line containing a right angle rather than a straight line. This moves the joining line of the electrode further away from the sensor. However, a straight line or any other could be used in other embodiments. Further, in this embodiment the circles of the electrodes are hollow, but they could be filled in. Any arrangement of electrode would be suitable, as long as a portion of it passes over each hole in spacer layer 402. The top ground layer 403 is attached to spacer layer 402 so that each circle is over a hole, and preferably centred. The attachment forms an airtight seal between the layers.

The arrangement of discrete electrodes in top ground layer 403 allows each electrode to be grounded, open, or have another signal. This will be described further and allows the sensor pad to be extremely configurable. However, in the simplest embodiment, a single electrode could pass over all the spacer holes, or the top layer could simply be a flexible ground plate.

The top ground layer is sealed to the spacer layer, and the spacer layer is sealed to the electrically active layer. This forms a substantially hermetic void in the hole 509. Thus, the entire sensor pad 106 is a matrix of hermetic voids, each having a top electrode that may be grounded carried on a flexible membrane, and transmitter and receiver electrodes at the base. In an alternative embodiment, the spacer layer could be omitted and the top ground layer could be sealed directly to the electrically active layer. This would form a series of bubbles or pockets. As a further alternative, a thick adhesive could be used in order to form a spacer layer during the sealing process. Any arrangement would be suitable where a hermetic void is formed between a flexible top layer comprising an electrode, and the base transmitter and receiver electrodes.

Thus the sensor pad is made up of a plurality of sensors, although in other embodiments a single sensor could be provided. Each sensor comprises a part of the flexible top layer and a part of the electrically active layer; therefore the sensor is considered to have a moveable layer which is the part of the top layer, and a fixed layer which is the part of the electrically active layer. These two layers are sealed together, with or without a spacer layer, such that a hermetic void is defined inside the sensor. An intersection point between two electrodes is contained within the sensor. The moveable layers of the sensors can be grounded in groups, using the ground electrode that runs across the top. However, a simple ground layer could be used, or a method of grounding each sensor individually.

Using this arrangement, sensor 501 detects movement of top layer 403 in response to changes in air pressure. The embodiment of the invention described herein is suitable for sensing air pressure, but such a sensor is also suitable for use in any embodiment where movement of the membrane is indicative of a change. It can be used to detect any pressure applied directly to the top layer which causes it to move towards or away from the electrically active layer.

In one alternative embodiment, a sensor pad comprising one or more sensors similar to sensor 501 could be placed on a pulse point such as the wrist on a person or animal, with the top layer in close contact with the skin. The small movement of the skin in response to each pulse would be sufficient to move the top layer towards the electrically active layer. During the gap between pulses, air pressure within the hermetic void of the sensor would push the top layer away from the electrically active layer and back to its original position. In this way, the heartrate could be measured. Such an embodiment could include a strap to hold the sensor in place and in firm contact with the skin, and the size of the sensor and the material used for the membrane would need to be suitably chosen. For example, compared with a sensor for sensing air pressure, the sensor might need to be smaller and the membrane might need to be more flexible or thinner.

In a still further embodiment, such a sensor could be used to weigh an object. The sensor would need to be wide enough in both directions for a complete object to be placed over the hermetic void, with no part of it being placed on the spacer layer. The membrane would need to be strong in order to take the maximum weight that might be measured. An object placed on the sensor would move the top layer towards the electricallly active layer by an amount dependent upon its weight of the object. Once the object was removed, air pressure within the hermetic void would push the top layer back to its original position, allowing a next object to be measured.

In a still further embodiment, the sensor could be used as a button, to detect a press by a user. This would be a more simple calculation than in other embodiments: movement of the top layer towards to the electrical layer above a certain threshold would be counted as the beginning of a button press. When the user ceased to apply pressure, the air pressure within the hermetic void would push the top layer back to its original position. If the length of press were important, movement away from the electrical layer back below that threshold would be counted as the end of the button press. Alternatively, the movement back below the threshold would simply make the button available for another press. If the grounding electrodes were on the lower side of the top layer, ie inside the hermetic voids, this embodiment could be particularly useful in an environment where electronics need to be sealed, such as underwater or in an explosive or otherwise hazardous atmosphere. Other embodiments are also envisaged.

FIG. 6

Figure 6:
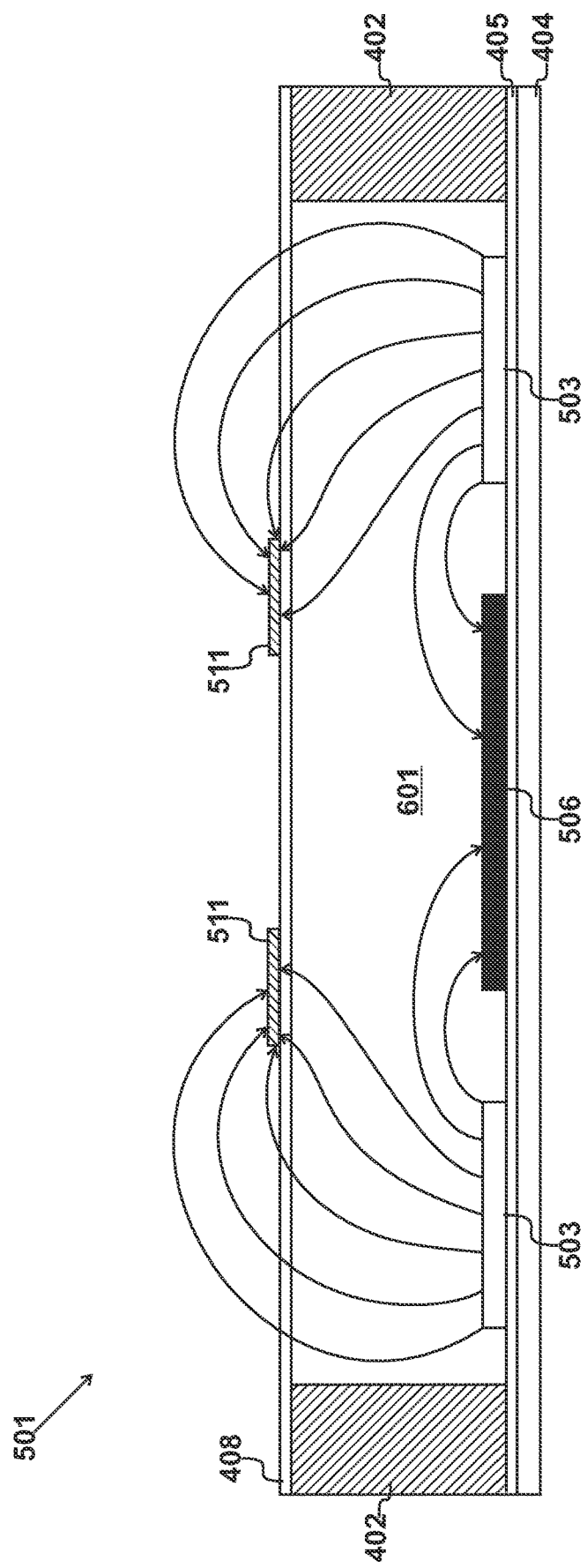
FIG. 6 is a cross section of the sensor shown in FIG. 5.

Sensor 501 is shown in cross section in FIG. 6 through the line A-A in FIG. 5.

Ground plate 404 is covered by membrane 405 carrying transmit electrode 503 and receive electrode 506. The convention of representing transmitter electrodes with a white fill, and receiver electrodes with a black fill, will be adhered to throughout the accompanying drawings. Spacer 402 defines hole 509, and the whole is covered by membrane 408 carrying electrode 511. Thus, the hole 509, with membrane 405 below and membrane 408 above sealed to the spacer material, forms a hermetic void 601. Any change in air pressure in area 602, adjacent to the void and outside the sensor pad, will cause flexible membrane 408 to move towards or away from electrically active layer 401.

On application of a voltage to a transmitter electrode, an electric field forms which causes capacitive coupling to other receiver electrodes in close proximity. This is measured by the response in the receiver electrode. As shown in FIG. 3, this response is passed through buffer 307 and ADC 308 to be stored in memory 302 and processed by processor 301.

The electric field is shown by the arrows in FIG. 6. As can be seen, some of the flux lines loop from transmitter electrode 503 to receiver electrode 506 so as to effect capacitive coupling, while others are drawn to ground electrode 511. It should be understood that the sensor 501 is round, and that therefore there is additional capacitive coupling occurring that is not shown in this cross-sectional diagram.

The amount of capacitive coupling between the electrodes will depend upon their exact shape and size, the thickness of the spacer, the shape and size of the ground electrode, and the amount of voltage applied. The sensor is therefore subject to design decisions around these elements in order to create a sensor that returns usable results, as will be discussed further with reference to FIG. 8.

In this embodiment ground plate 404 prevents flux lines developing underneath the electrodes, which reduces the capacitive coupling between the transmitter and receiver electrodes. Therefore, in situations where stray capacitance is not expected, the ground plate can be omitted, which reduces the amplification required on the output signal. This can be desirable as it also reduces the amplification of noise. In other situations, the ground plate may not be required because the sensor pad is to be affixed to a grounded material, such as the body of a car, which will perform the same function.

A single sensor is shown in FIGS. 5 and 6, which is the minimum provided for by the invention. However, in this embodiment the sensor pad includes a matrix of sensors as shown in FIG. 4. The matrix of transmitter, receiver and ground electrodes, in this embodiment, are not activated simultaneously but in sequence, as will be described with reference to FIG. 10.

FIG. 7

Figure 7:
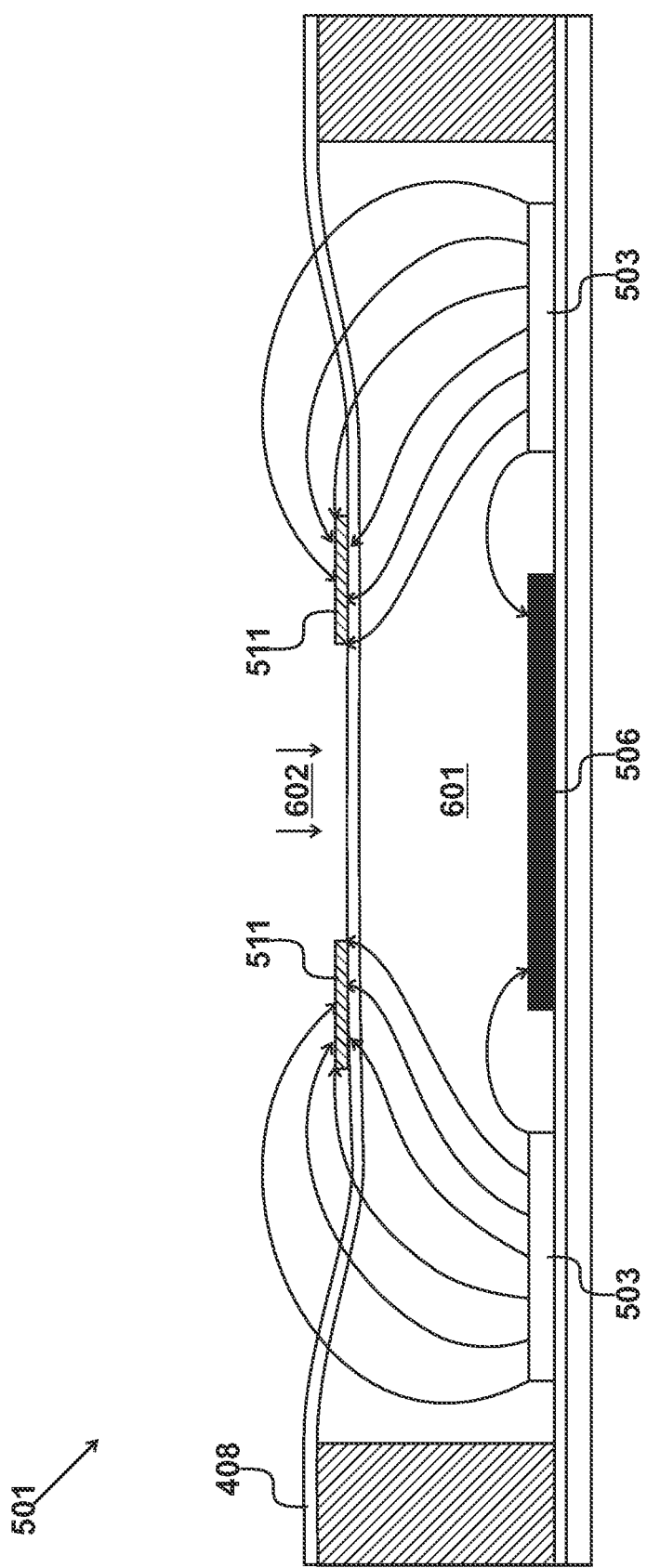
FIG. 7 is a cross section of the sensor shown in FIG. 5, showing measurement of high air pressure.

FIG. 7 illustrates the effect of high air pressure on sensor 501. When the air pressure in area 602 is higher than that in hermetic void 601, the difference in pressure causes membrane 408, and therefore electrode 511, to move closer to electrically active layer 401. The proximity of ground electrode 511 to the electrically active layer causes more of the electric field to be drawn to ground electrode 511, as shown by the arrows. This reduces the capacitive coupling between electrodes 503 and 506, and therefore the response from electrode 506 is reduced.

FIG. 8

Figure 8:
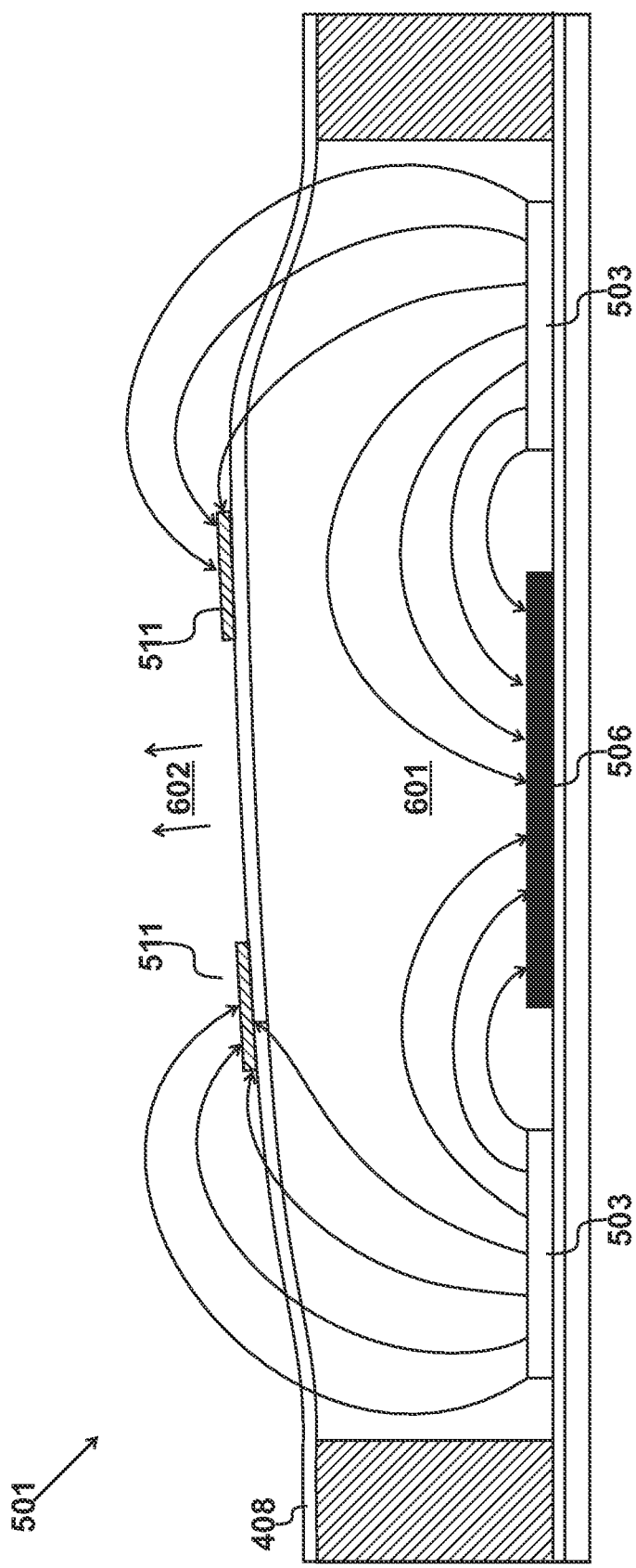
FIG. 8 is a cross section of the sensor shown in FIG. 5, showing measurement of low air pressure.

FIG. 8 illustrates the effect of low air pressure on sensor 501. When the air pressure in area 602 is lower than that in hermetic void 601, the difference in pressure causes membrane 408, and therefore electrode 511, to move away from electrically active layer 401. The remoteness of ground electrode 511 from the electrically active layer causes less of the electric field to be drawn to ground electrode 511, as shown by the arrows. This increases the capacitive coupling between electrodes 503 and 506, and therefore the response from electrode 506 is increased.

The effect of differences in air pressure is felt as wind, and the wind can be considered to have a direction. Thus, in FIG. 8, the change in air pressure does not affect sensor 501 evenly but pulls membrane 408 up more on one side (shown on the right of the picture) than the other. This causes more capacitive coupling on this side of the sensor than on the left-hand side. However, it is the total response of receiver electrode 506 that is measured, and therefore in this embodiment an average difference in air pressure is provided as the measurement. In the alternative embodiment described with reference to FIGS. 13 to 19, it is possible to additionally indicate the direction of the wind relative to the sensor.

Thus, referring to FIGS. 7 and 8, sensor 501 provides apparatus wherein the degree of capacitive coupling between transmitter and receiver electrodes is indicative of the movement of the grounded part of a top layer, which here is membrane 408, towards or away from the electrically active layer, and thereby of the pressure applied to the grounded part of said top layer, either positive or negative. When a sensor pad is constructed from a matrix of such sensors, each sensor provides an individual measurement of the difference in air pressure just above it and within its hermetic void. Thus, the air pressure in a plurality of positions can be measured, providing data on air pressure around the object to which the sensor pad is attached.

Therefore, it can be seen that the exact dimensions and layouts of the electrodes and the spacer layer is a matter of design. For example, the spacer layer needs to be of a thickness so that ground electrode 511 is close enough to electrically active layer 401 to draw some but not all of the electrical field. The size and shape of the electrodes will affect this, as will the voltage to be applied to the transmitter electrodes. Further, these aspects will affect the degree of flexibility required in membrane 408, which may affect the choice of material and thickness used.

FIG. 9

Figure 9:
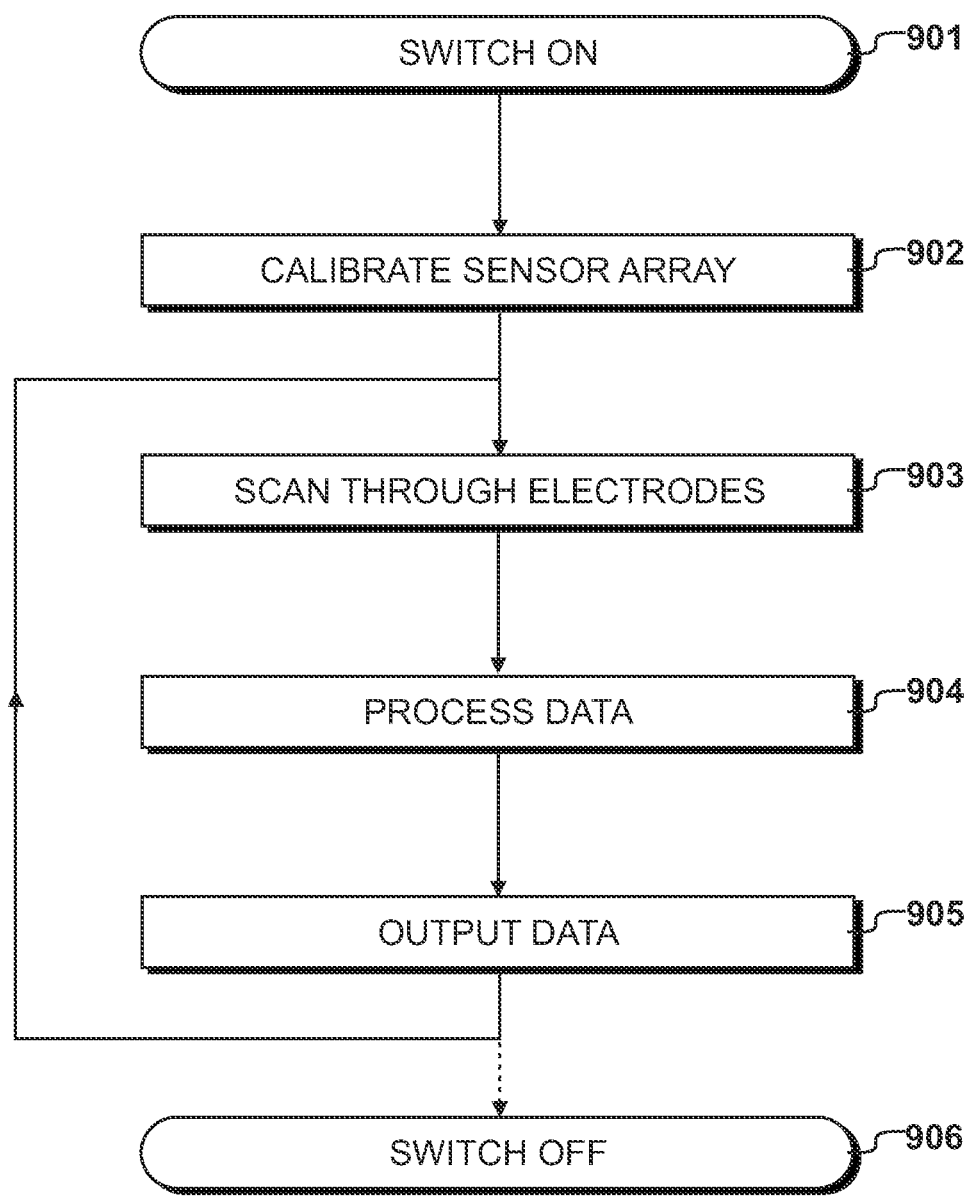
FIG. 9 shows steps carried out to operate the sensing apparatus shown in FIG. 1 using the sensor array embodiment shown in FIG. 4.

Steps carried out to operate sensing apparatus 105 are detailed in FIG. 9. The sensor pad 106 has been attached to an object.

At step 901, the control unit 107 is switched on, and at step 902 a calibration procedure is run. The calibration procedure is a scan of the sensor array (as will be described further below) carried out in normal atmospheric pressure and serves to establish reference values for capacitive coupling between transmitter and receiver electrodes. Once the calibration procedure has been run, the object may be moved, subjected to wind, etc. in order to gain air pressure measurements.

At step 903, sensor array 201 is scanned by cycling through the transmitter, receiver, and ground electrodes, in order to activate each individual sensor in sequence. This procedure will be described further with reference to FIG. 10. At step 904, the responses produced by the receiver electrodes are processed with respect to the reference values produced at step 902, and outputted at step 905 for display, storage, or further analysis. Control then returns to step 903 where the array is scanned again, or alternatively the sensor is switched off at step 906. Typically, scanning would continue all the time the object is moving or being subjected to wind.

FIG. 10

Figure 10:
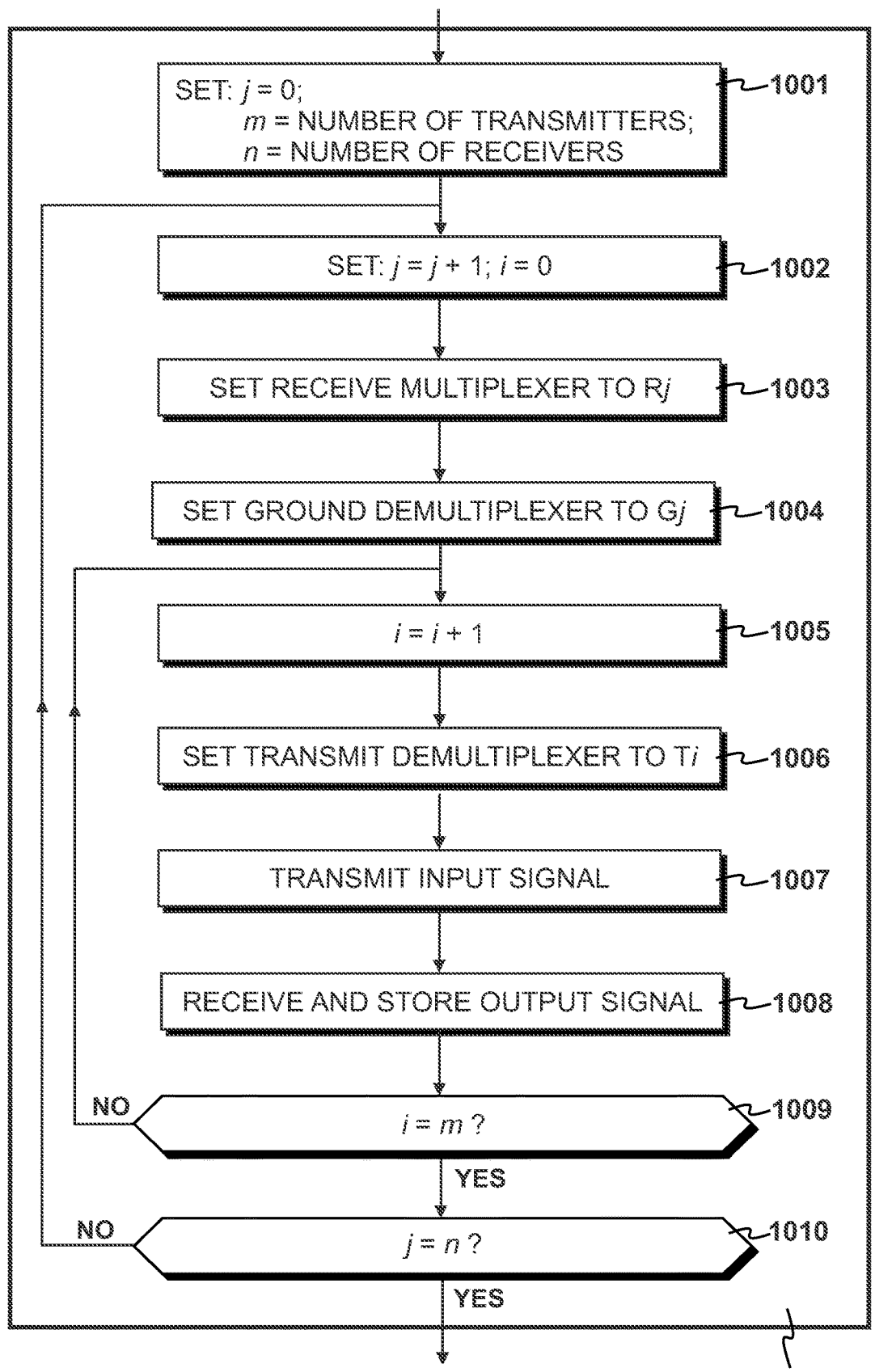
FIG. 10 details steps carried out during FIG. 9 to scan the sensor array shown in FIG. 4.

Steps carried out at step 903 to scan sensor array 201 by switching between the outputs of transmitter demultiplexer 205 and ground demultiplexer 207, and the inputs of receiver multiplexer 206, are detailed in FIG. 10.

At step 1001, the iterative variable j is set to equal 0. Constants m and n are set to be the number of transmitter electrodes and the number of receiver electrodes respectively. In this embodiment, there are the same amount of ground electrodes as receiver electrodes, and the ground electrodes are directly above the receiver electrodes. They can therefore be cycled through together. However, in other embodiments, the ground electrodes could be grouped differently and therefore the scanning process would vary accordingly.

At step 1002, the variable j is set to equal j+1, and an iterative variable i is set to equal zero. At step 1003, receiver multiplexer 206 is set to receive on the jth input; so, in the first case, the first input. At step 1004, ground demultiplexer 207 is set to connect the jth output to ground, so in the first case, the first output. At step 1005 the variable i is set to equal i+1, and at step 1006 transmitter demultiplexer 205 is set to output on the ith output; so in the first case, the first output. At step 1007, signal generator 203 produces an input signal which is transmitted on the selected transmitter electrode. At step 1008 signal detector 204 receives an output signal from the selected receiver electrode, and this is stored in memory 302 for processing at step 904.

At step 1009, a question is asked as to whether variable i is equal to m. If this question is answered in the negative, then control returns to step 1005 where i is incremented before an input signal is transmitted on the next transmitter electrode. If the question asked at step 1009 is answered in the affirmative, then a further question is asked at step 1010 as to whether the variable j is equal to n. If this question as answered in the negative, the control returns to step 1002 where j is iterated and the next receiver electrode and ground electrode is selected.

If the question asked at step 1010 is answered in the affirmative, then step 903 is complete. The effect of this transmission is to effect capacitive coupling for all sensors in turn, thereby creating a matrix of response data having dimensions m by n.

In this embodiment the ground electrodes 310 are simply set to ground or left open. At each iteration, the ground electrode above the selected receiver electrode is grounded, and the rest are open. In this way, other ground electrodes do not interfere with the sensing process. However, in other embodiments, the various ground electrodes could be switched to different signals, using switch 311. The ground could be a hard ground or a soft ground, as discussed above. Some electrodes could be provided with a different signal, such as a positive charge, thus creating a barrier between parts of the sensor pads. In a situation where processing power or battery life is at a premium but sensitivity is not so important, all the ground electrodes could be grounded at the same time.

An alternative approach could be that the sensor pad is scanned in two halves at the same time, thus halving the time taken to scan. This is possible if the individual sensors being simultaneously scanned are far enough apart to prevent interference.

The sensing apparatus described herein therefore allows for many different configurations, which are user-configurable to suit different environments.

FIG. 11

Figure 11:
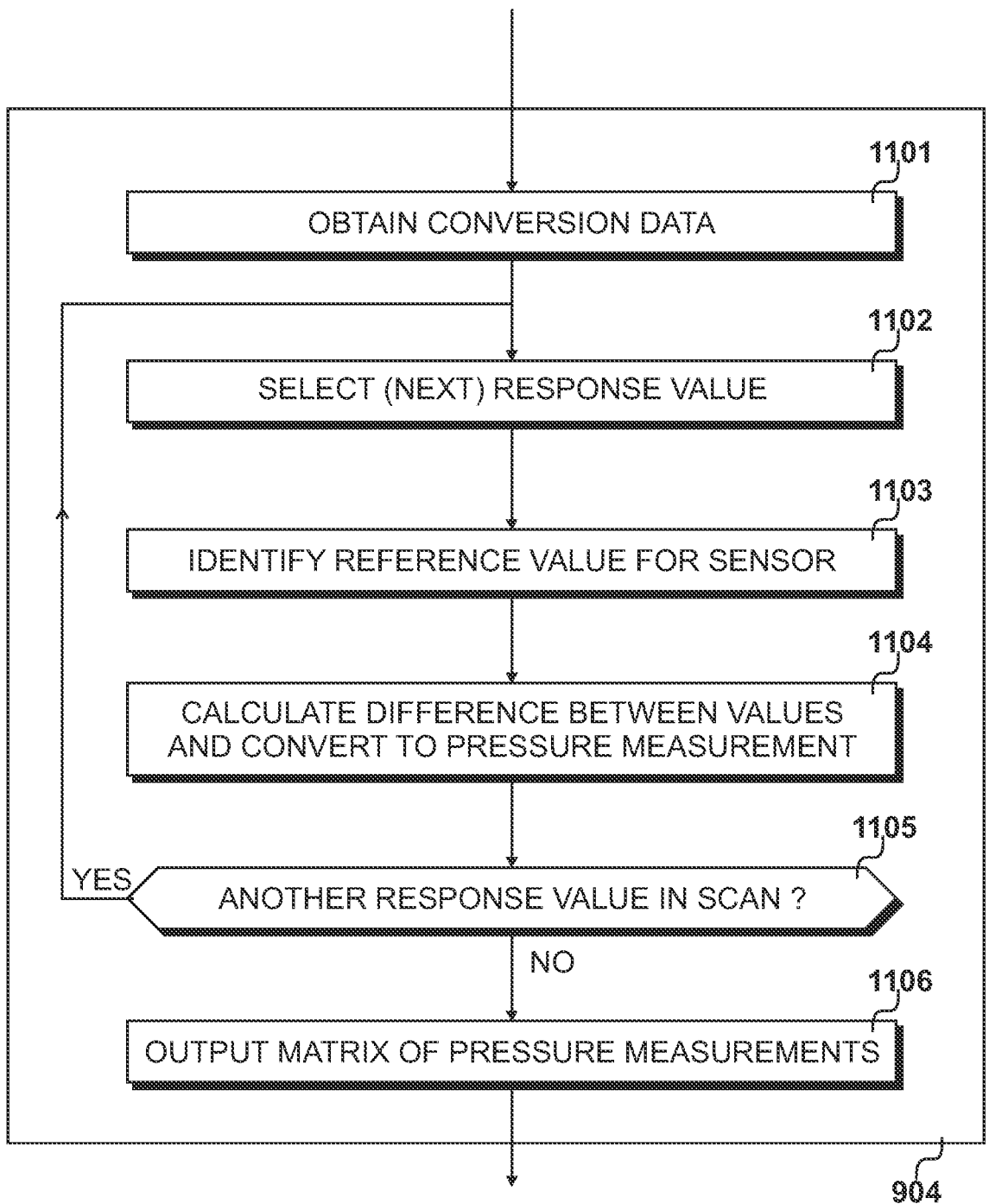
FIG. 11 details steps carried out during FIG. 9 to process response data.

FIG. 11 details step 904, at which the responses produced by sensor array 201 are processed. In practice, step 904 is likely to be run as a concurrent thread with step 903 in order to maximise processing efficiency. Responses are received sequentially from each sensor, and each response can be associated with its corresponding transmitter-receiver pair in order to identify the sensor. At step 1101 conversion data is obtained from storage 314 and loaded into memory 302. The conversion data is a lookup table or a formula that is used during step 1104 to convert a calculated value to an air pressure measurement. This conversion data is dependent upon the exact configuration selected by the user and is obtained in a controlled environment. By applying a known air pressure to a sensor such as that shown in FIG. 5, the difference in capacitive response between a reference value and the sensor's response value is stored in the conversion data as corresponding to that known air pressure. This is repeated for various air pressures until the conversion data is complete. Additional values can be inferred by interpolation. If user-selectable configurations of the apparatus are provided in control unit 107, then there will be conversion data for each configuration, and so the correct data should be obtained from storage at step 1101. Alternatively, conversion data can be loaded from an external source via I/O 313. At step 1102 a response value is selected, and at step 1103 the reference value, obtained during the calibration process at step 902, for the transmitter-receiver pair that produced the response value is identified. At step 1104 the difference between the response value and the reference value is calculated and converted to a pressure measurement using the conversion data obtained at step 1101. The calculated value represents the difference in capacitive coupling between the reference value obtained during the calibration process and the response value obtained at the time of scanning. A positive value indicates an increase in capacitive coupling, meaning that the ground electrode has moved away from the electrically active layer, indicating lower pressure outside the sensor than in the hermetic void. A negative value indicates a decrease in capacitive coupling, meaning that the ground electrode has moved towards the electrically active layer, indicating higher pressure outside the sensor than in the hermetic void. The calculated value is therefore converted to an air pressure measurement using the conversion data obtained in a controlled environment.

It should be noted that even if conversion data is not available, the calculated values themselves provide information on relative air pressure between the sensors. Additionally, this conversion process need not take place during step 904. A matrix of calculated values could be stored or output, with the conversion to actual air pressure measurements being done at a later time.

At step 1105 a question is asked as to whether another response value has been received within the current scan. If this question is answered in the affirmative then control is returned to step 1101 and the next response value is selected. If the scan is complete, then a matrix of air pressure measurements is output at step 1106, either via I/O 313, or to storage 314 for later output to an external unit. If the output is immediate, then the measurements may be displayed or stored by an external computer. In alternative embodiments, the air pressure measurements could be output sequentially as they are produced, rather than being stored and output as a matrix. It is also possible for the user to configure the sensing apparatus 105 to only output values for a particular set of sensors in sensor pad 106. If this option has been selected, then the processor may skip the unwanted response values during step 904, or it may skip certain transmitter electrodes and receiver electrodes during the scan of step 903.

FIG. 12

Thus, control unit 107 provides inputs sequentially to transmitter electrodes and receives responses from sequentially selected receiver electrodes. These are stored as a matrix of values per scan. This data therefore represents a stream of air pressure measurements across the sensor pad 106 while the control unit 107 is switched on.

The embodiment described herein is able to scan a sensor pad containing 1500 sensors in around one second. This may be faster or slower for other embodiments. Therefore, the choice of how many sensors to place on pad 106 is only restricted by the acceptable scan speed. The pad 106 can be of any size and include any number of receive and transmit electrodes. In the example shown in FIG. 4 the numbers are the same, but this is not necessary.

Figure 12:
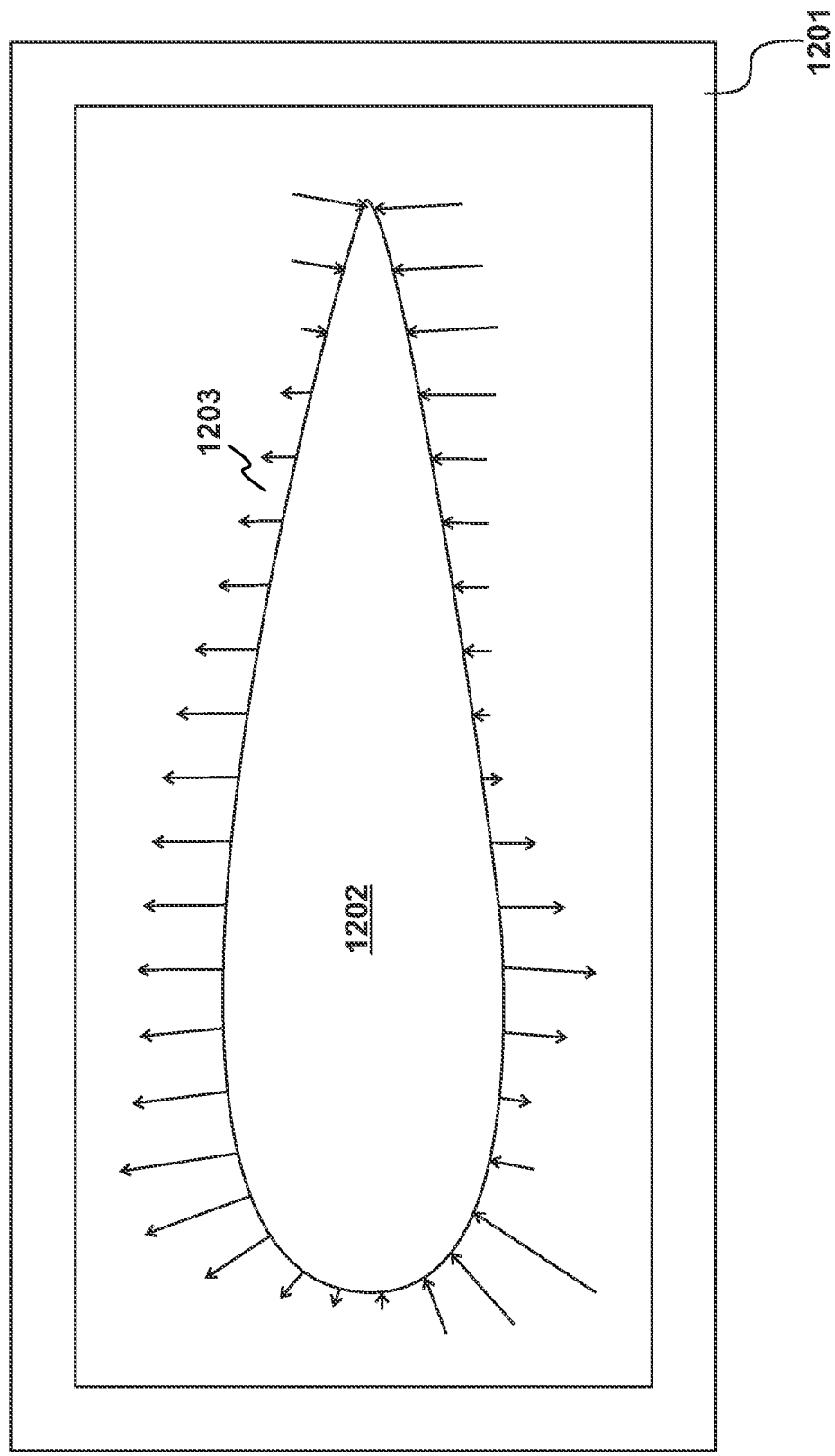
FIG. 12 is an example of the display of air pressure measurements produced by the sensing apparatus shown in FIG. 1.

FIG. 12 shows an example of how the air pressure measurements might be displayed on a display unit 1201. Display unit 1201 may be connected to control unit 107, either directly or via a computing device, to display measurements in real time. Alternatively, display unit 1201 may be displaying stored measurements previously output from control unit 107. A single column from a single matrix of measurements is displayed as a series of air pressure arrows 1203 on a cross-sectional image 1202 of aerofoil 101. In this example the sensor pad used comprised 40 sensors in one direction, providing 40 air pressure measurements around the aerofoil.

Arrows pointing away from the aerofoil indicate that the sensor in that position noted a lower pressure outside the sensor than inside, and arrows pointing towards the aerofoil indicate higher pressure. Many methods of displaying air pressure exist, and any can be used with the measurements obtained by the sensing apparatus 101.

FIG. 13

The arrangement of transmitter and receiver electrodes described with respect to FIGS. 4 to 11 is one embodiment of sensor apparatus 105. FIGS. 13 to 19 show an alternative embodiment. This has a different sensor array 1300 suitable for use with an identical control unit 107.

Figure 13:
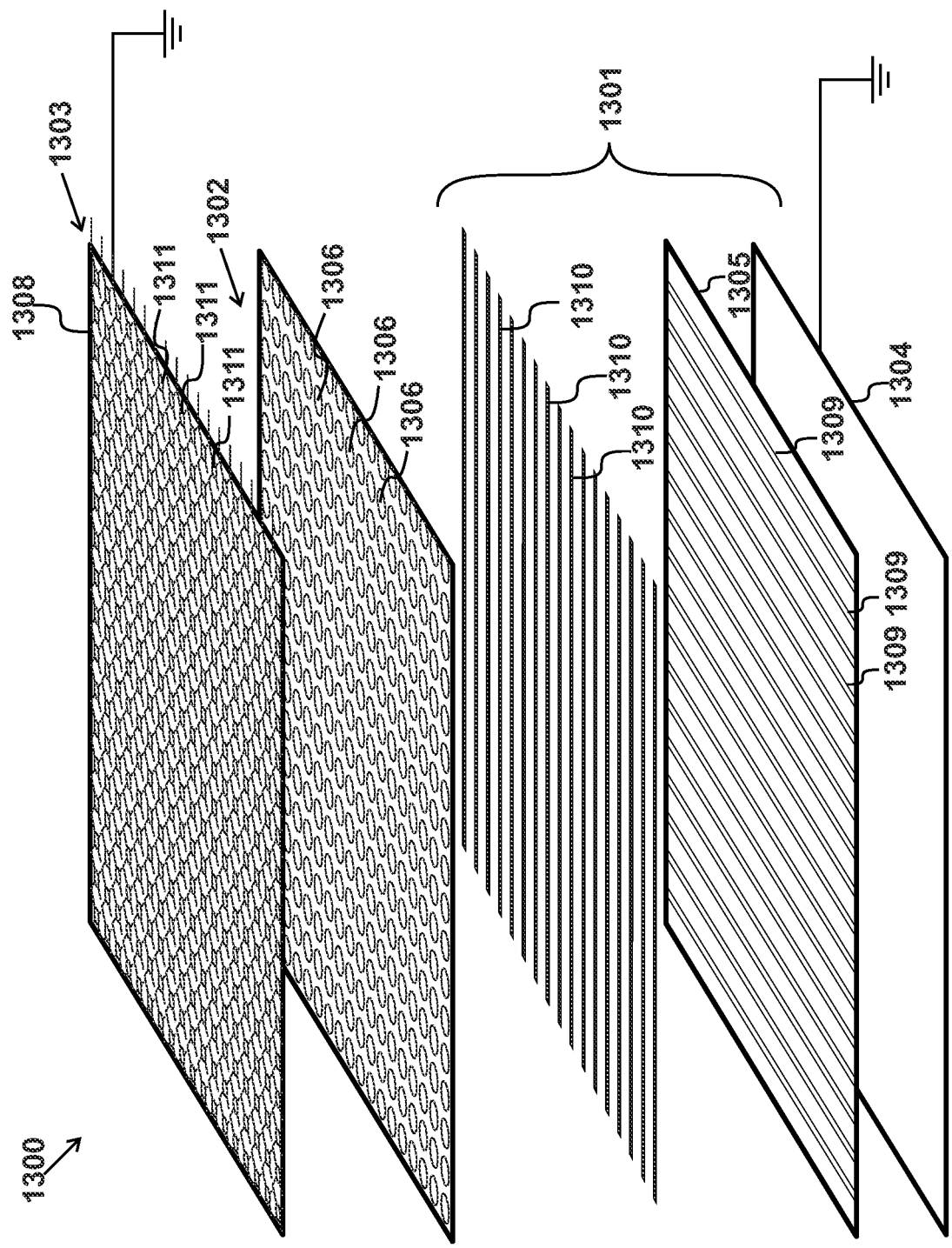
FIG. 13 is an exploded diagram of an alternative sensor array.

FIG. 13 is an exploded diagram of sensor array 1300. It comprises four layers, electrically active layer 1301, spacer layer 1302, top ground layer 1303, and ground plate 1304.

Electrically active layer 1301 comprises a plurality of transmitter electrodes 1309, and a plurality of receiver electrodes 1310. Each transmitter and receiver electrode are a substantially straight line. However, as will be shown in FIGS. 14 and 15, each transmitter may bulge between intersections between electrodes, and/or may narrow at intersections. The connections from the electrodes to control unit 107 are not shown in this figure. In this embodiment the distance between adjacent electrodes is 10 mm; however, this can be varied depending upon the resolution required.

Layer 1301 also includes a membrane 1305 onto which the electrodes are, in this embodiment, printed using conductive ink containing, for example, indium-tin-oxide, graphene, copper, or silver. In addition, the membrane may be rigid or flexible depending upon the application. In this embodiment the transmitters 1309 and the receivers 1310 are printed on the same side of the membrane. In other embodiments they could be on separate membranes or on either side of a single membrane.

Spacer layer 1302 is a layer of silicon, in this embodiment 0.5 mm thick, that defines a plurality of holes 1306 open at both ends. These holes line up with the grid created by the electrodes 1309 and 1310 so that each hole is contained within a grid square. This is in contrast to the sensor array 201, in which each spacer hole covers an intersection. Spacer layer 1302 is attached to electrically active layer 1301 to create an airtight seal. In this embodiment spacer layer 1302 is adhered to electrically active layer 1301, but other methods could be used. As with spacer layer 402, alternative materials and thicknesses can be used.

Top ground layer 1303 is similar to ground layer 403 and comprises a plurality of ground electrodes 1311 printed in parallel on a flexible polyester membrane 1308 that is 0.1 mm thick. As with membrane 408, alternative materials and thicknesses can be used, and the electrodes may be on either or both sides of the membrane. In this embodiment, each ground electrode comprises a plurality of circles connected together. Each circle lines up with one of the holes in spacer layer 1302. Ground electrodes 1311 are connected to switch 311 via demultiplexer 207, and may each be grounded, open, or have another signal. Top ground layer 1303 is attached to spacer layer 1302 to create an airtight seal. In this example the layers are adhered together, but another method could be used. Membrane 1308 is flexible enough to allow it to move under changes in air pressure.

Similar to sensor array 201, ground plate 1304 is provided below the electrically active layer 1301 but may be omitted.

FIGS. 14a and 14b

FIGS. 14a and 14b show two options for the configuration of transmitter electrodes and receiver electrodes.

In FIG. 14a, which is the design used in this embodiment, the transmitter electrodes 1309 and the receiver electrodes 1310 are thin at the point of intersection, but bulge outwards between the intersections. For example, transmitter electrode 1401 bulges at point 1402, but is thin at the point 1403 where it intersects with receiver electrode 1404.

In FIG. 14b, which is an alternative embodiment of the electrodes, the electrodes thin at the point of intersection. For example, the transmitter electrode 1411 is thinner at the point 1412 where it intersects with receiver electrode 1413, which is also thinner at this point.

In both cases, the electrodes are designed so that the part that intersects with another electrode is thinner than the part creating a grid square. Each square defines a cell in which capacitive coupling occurs, and a cell is referred to as active if coupling is currently occurring. The thinning of the electrodes at the intersection reduces the capacitive coupling that occurs at the intersection. This is shown in FIG. 14a by the flux arrows in cells 1405, 1406, 1407 and 1408, which illustrate the capacitive coupling between electrodes 1401 and 1404. In all designs of electrodes, in order to prevent interference between the intersecting electrodes when they are printed on the same side of the membrane, a small dielectric element may be printed or otherwise inserted between the electrodes at the intersection points.

FIG. 15

Figure 15:
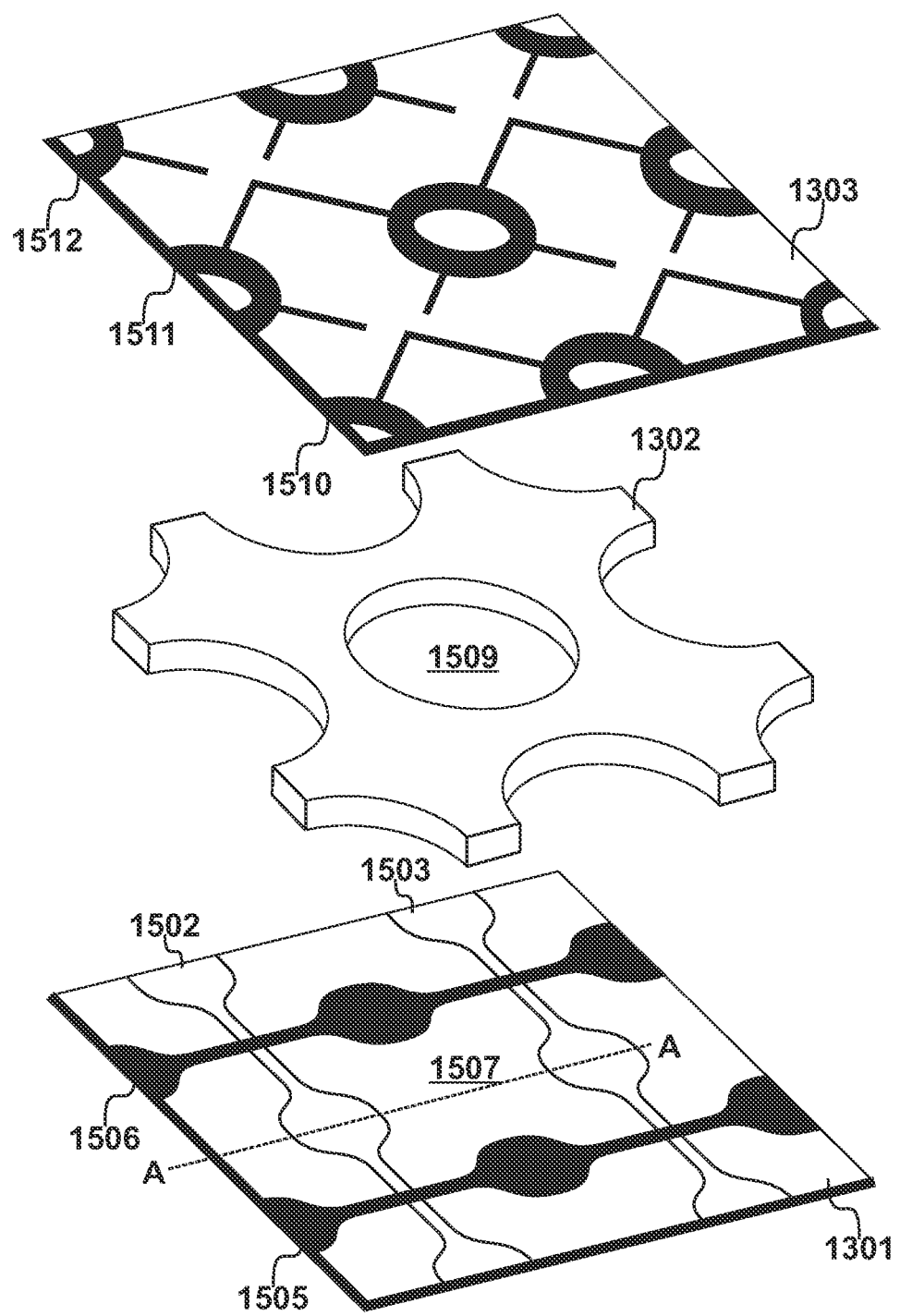
FIG. 15 is an exploded diagram of a sensor shown in FIG. 13.

The sensor array 1300 shown in FIG. 13 provides a matrix of individual sensors, each one comprising a ground electrode separated from a cell, created by transmitter and receiver electrodes in the electrically active layer, by a void created by a hole in spacer layer 1302. An exploded diagram of a single sensor 1501 is shown in FIG. 15. (Ground plate 1304 is not shown in this diagram.)

Layer 1301 is shown as a single layer, with transmit electrodes 1502 and 1503 orthogonal to receive electrodes 1505 and 1506. The electrodes have the shape shown in FIG. 14a, although other shapes are possible. The cell 1507, created by two transmitter electrodes and two receiver electrodes, forms the base of the single sensor 1501.

The hole 1509 in spacer layer 1302 is, in this embodiment, not as wide as cell 1507, but contains some of the bulge of each of the electrodes 1502, 1503, 1505 and 1506. The material of spacer layer 1302 is sealed to electrically active layer 1301 on top of the electrodes.

Top ground layer 1303 has ground electrodes 1510, 1511 and 1512. Each is a series of circles joined by a line. In this example each joining line between a pair of circles is formed as a line containing a right angle rather than a straight line. This moves the joining line of the electrode further away from the sensor. However, a straight line or any other could be used in other embodiments. Further, in this embodiment the circles of the electrodes are hollow, but they could be filled in. Any arrangement of electrode would be suitable, as long as a portion of it passes over each hole in spacer layer 1302. The top ground layer 1303 is attached to spacer layer 1302 so that each circle is over a hole, and preferably centred. The attachment forms an airtight seal between the layers.

The arrangement of discrete electrodes in top ground layer 1303 allows each electrode to be grounded, open, or have another signal. This allows the sensor pad to be extremely configurable. However, in the simplest embodiment, a single electrode could pass over all the spacer holes, or the top layer could simply be a flexible ground plate.

As with the sensor array 201, the top ground layer is sealed to the spacer layer, and the spacer layer is sealed to the electrically active layer. This forms a substantially hermetic void in the hole 1509. In an alternative embodiment, the spacer layer could be omitted and the top ground layer could be sealed directly to the electrically active layer. This would form a series of bubbles or pockets. As a further alternative, a thick adhesive could be used in order to form a spacer layer during the sealing process. Any arrangement would be suitable where a hermetic void is formed between a flexible top layer comprising an electrode, and the base transmitter and receiver electrodes.

Thus the sensor pad is made up of a plurality of sensors, although in other embodiments a single sensor could be provided. Each sensor comprises a part of the flexible top layer and a part of the electrically active layer; therefore the sensor is considered to have a moveable layer which is the part of the top layer, and a fixed layer which is the part of the electrically active layer. These two layers are sealed together, with or without a spacer layer, such that a hermetic void is defined inside the sensor. Four intersection points between electrodes form a cell, and the area inside the sensor is within this cell. The area itself is not bounded by the intersection points, as in this embodiment the area is bounded by the edge of the aperture in the spacer layer, and the electrodes are completely covered by the spacer. However, in other embodiments the area could be the entirety of the cell, and bounded by the intersection points. There could be an alternative number of intersection points bounding each cell, rather than four, if a different arrangement of electrodes were used. The moveable layers of the sensors can be grounded in groups, using the ground electrode that runs across the top. However, a simple ground layer could be used, or a method of grounding each sensor individually.

As described with reference to the first embodiment, a sensor such as sensor 1501 detects movement of top layer 1303 and could be used in many other embodiments, including those previously described. If the direction of applied pressure is not needed, then the four corner measurements could simply be averaged or summed in order to create a single measurement. This could increase accuracy over the first embodiment described, as it would decrease the effects of a single inaccurate electrode.

In the previously-described embodiment of a pulse sensor, the sensing apparatus could be used to additionally provide the strength of a pulse as well as its rate. With the sensor of the first embodiment, variable placement of the sensor relative to the pulse point would vary the pressure applied to the sensor, meaning that consistent and calibrated strength measurements could not be achieved. However, the second embodiment could be used to consistently place the sensor, as follows. If the sensing apparatus measured movement in the top layer of a sensor but only on one or two corners, the apparatus could instruct the user to move the sensor until the movement is detected by all four corners. The apparatus could continue to instruct this movement until all four corners detected the movement equally, meaning that the pulse point is in the middle of a sensor. The movement of the top layer could then be converted into a pulse strength, or simply ensure that the pulse rate is more accurately counted.

In the previously-described embodiment of a button, corner measurements could be used to increase accuracy. For example, if an array of sensors from the first embodiment were used as a keyboard, then an inaccurate press might register on two adjacent sensors. Using sensors from the second embodiment, the system could require that all four corner measurements should be be above a certain threshold in order for the button press to be accepted, or that all four corner measurements should be within a certain amount of each other, thus only accepting button presses that are reasonably central to the sensor.

Other embodiments in which it would be useful to measure the direction of applied pressure are envisaged.

FIG. 16

Figure 16:
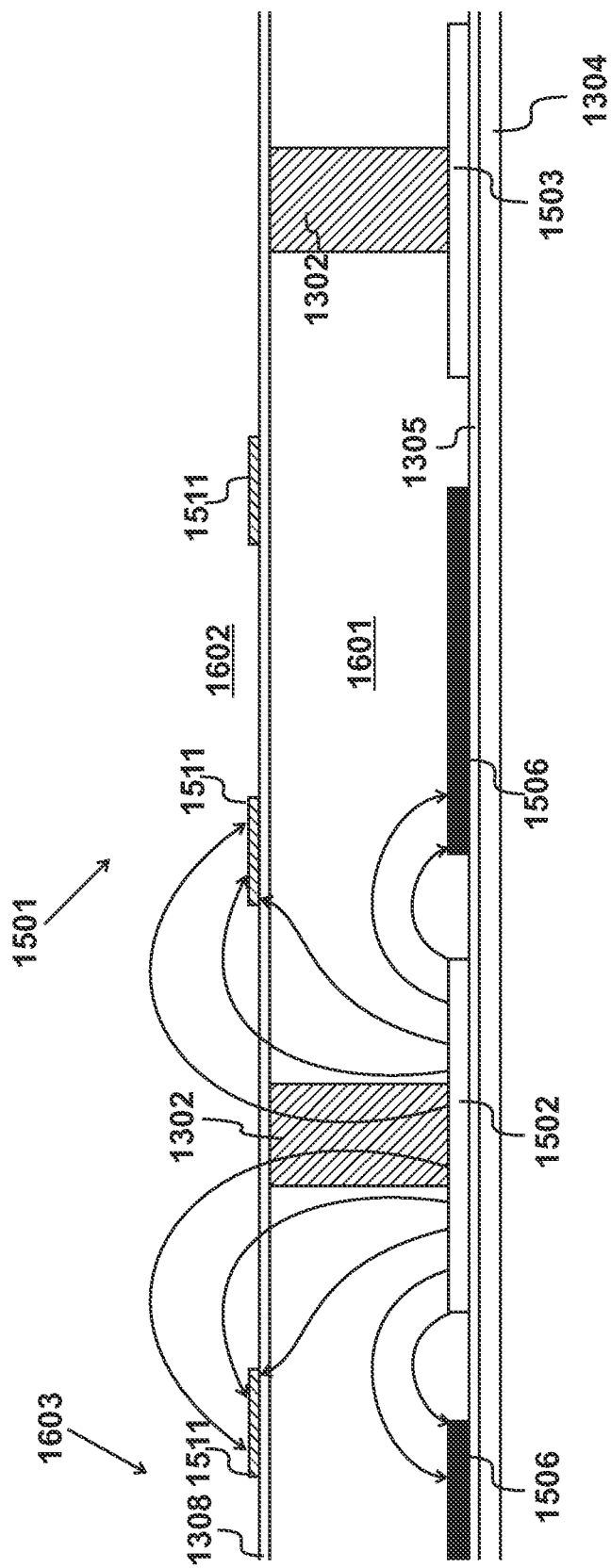
FIG. 16 is a cross section of the sensor shown in FIG. 15.

Sensor 1501 is shown in cross section in FIG. 16 through the line A-A in FIG. 15.

Ground plate 1304 is covered by membrane 1305 carrying transmitter electrodes (1502 and 1503) and receive electrode 1506. Spacer 1302 defines hole 1509, and the whole is covered by membrane 1308 carrying electrode 1511. Thus, the hole 1509, with membrane 1305 below and membrane 1308 above sealed to the spacer material, forms a hermetic void 1601. Any change in air pressure in area 1602, adjacent to the void and outside the sensor pad, will cause flexible membrane 1308 to move towards or away from electrically active layer 1301.

On application of a voltage to a transmitter electrode, an electric field forms which causes capacitive coupling to other receiver electrodes in close proximity. This is measured by the response in the receiver electrode. The electric field is shown by the arrows in FIG. 16. As can be seen, some of the flux lines loop from transmitter electrode 1502 to receiver electrode 1506 so as to effect capacitive coupling, while others are drawn to ground electrode 1511. The amount of capacitive coupling between the electrodes will depend upon their exact shape and size, the thickness of the spacer, the shape and size of the ground electrode, and the amount of voltage applied. The sensor is therefore subject to design decisions around these elements, in order to create a sensor that returns usable results.

When high air pressure causes membrane 1308 to move towards electrically active layer 1301, the capacitive coupling between electrodes 1502 and 1506 decreases, in a similar way to that illustrated in FIG. 7. When low air pressure causes membrane 1308 to move away from electrically active layer 1301, the capacitive coupling between electrodes 1502 and 1506 increases, in a similar way to that illustrated in FIG. 8.

In this embodiment, one transmitter and receiver electrode is active at one time. As shown in FIG. 14*a*, this creates capacitive coupling in four adjacent cells. In this cross-section, it can be seen how coupling is also caused in the neighbouring sensor 1603. All four active cells will be shown in the plan view in FIG. 17.

Therefore, in order to achieve a single measurement at sensor 1501, four responses must be combined—transmitter electrode 1502 coupled to receiver electrode 1505, transmitter electrode 1503 coupled to receiver electrode 1505, transmitter electrode 1502 coupled to receiver electrode 1506, and transmitter electrode 1503 coupled to receiver electrode 1506. These are the four transmitter-receiver pairs that contribute to cell 1507. In the simplest embodiment, these responses may be summed to produce a single measurement. However, it is additionally possible to consider each of the four measurements separately in order to determine the direction of wind on the sensor, as well as the air pressure measurement. This will be described further with respect to FIGS. 17 to 19.

A single sensor 1501 is shown in FIGS. 15 and 16, which is the minimum provided for by the invention. However, in this embodiment the sensor pad includes a matrix of sensors as shown in FIG. 13.

FIG. 17

Figure 17:
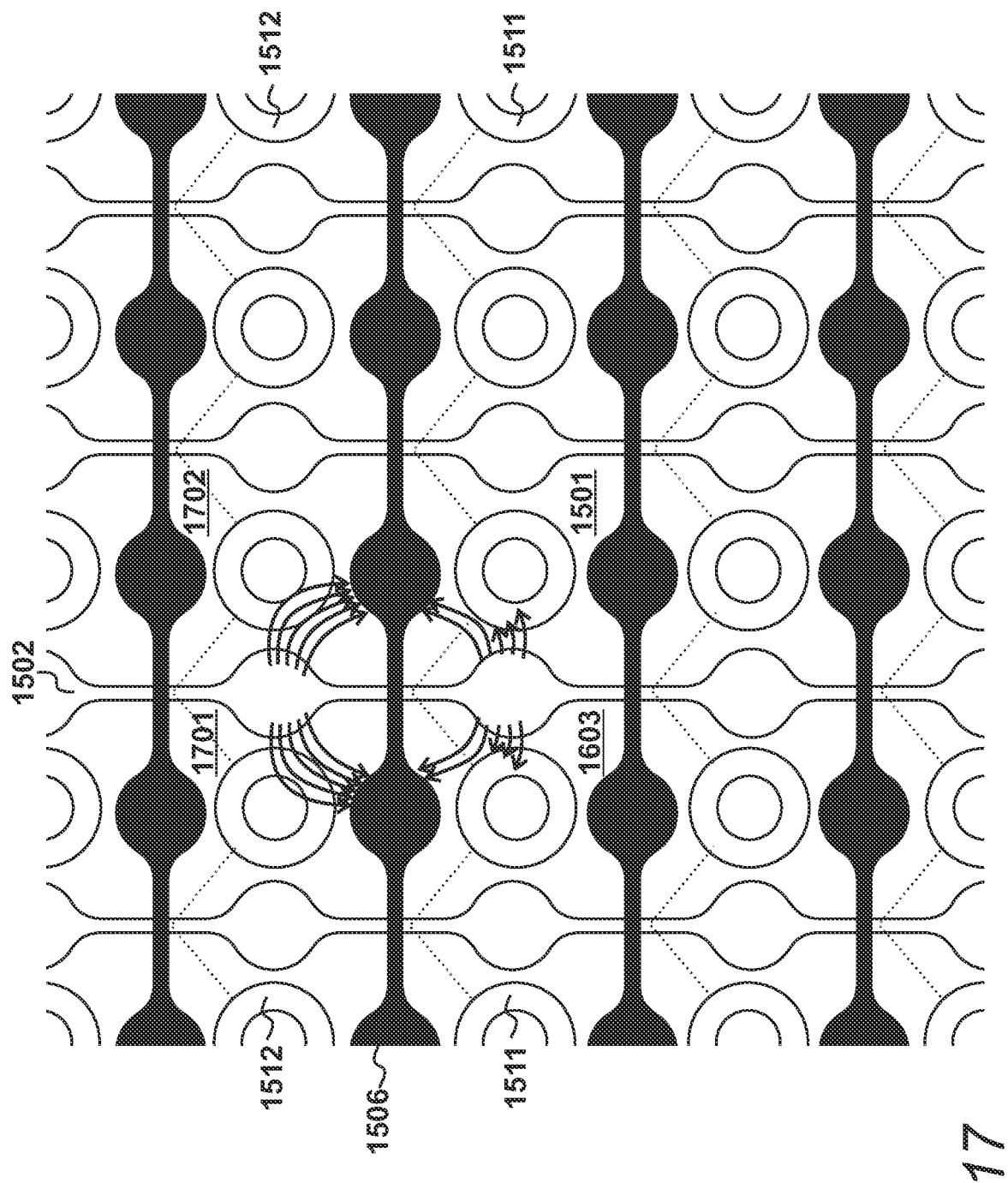
FIG. 17 is a plan view of the electrodes shown in FIGS. 15 and 16.

FIG. 17 shows a plan view of the transmitter, receiver, and ground electrodes shown in FIGS. 15 and 16, illustrated as part of the larger sensor array 1300. This illustration is for the purposes of showing the flux lines between the electrodes, and therefore spacer 1302 is not shown for clarity. In addition, the lines connecting the circles comprising each ground electrode are shown as light dotted lines, again for clarity.

In this illustration, transmitter electrode 1502 and receiver electrode 1506 are activated, and ground electrode 1511 is grounded. The other ground electrodes, such as ground electrode 1512, are left open. When an excitation signal is provided to transmitter electrode 1502, capacitive coupling occurs between electrode 1502 and receiver electrode 1506 in four cells—that of sensors 1501 and 1603, and also 1701 and 1702. In cells 1701 and 1702, because ground electrode 1512 is open, no capacitive coupling occurs between transmitter electrode 1502 and ground electrode 1512, and therefore all the capacitive coupling in these cells occurs between transmitter electrode 1502 and receiver electrode 1506.

In the cells of sensors 1501 and 1603, however, ground electrode 1511 is grounded, and therefore capacitive coupling occurs between both transmitter electrode 1502 and receiver electrode 1506, and transmitter electrode 1502 and ground electrode 1511. This is the field shown in cross-section in FIG. 16. It will be appreciated that the electrical field is only represented by the flux arrows shown in these Figures and is a field rather than a series of discrete connections.

Thus, the total response value returned by receiver electrode 1506 is the total capacitive coupling in all four cells. However, when measuring air pressure for sensors 1501 and 1603, the capacitive coupling in cells 1701 and 1702 will not change, and therefore will be cancelled out when the response value is compared with the reference value. Therefore, the returned response value for any transmitter-receiver pair is stored as a corner value for each of two adjacent sensors. In this example, the response value from receiver 1506 would be stored as the top right corner value for sensor 1603 and the top left corner value for sensor 1501.

FIG. 18

Figure 18:
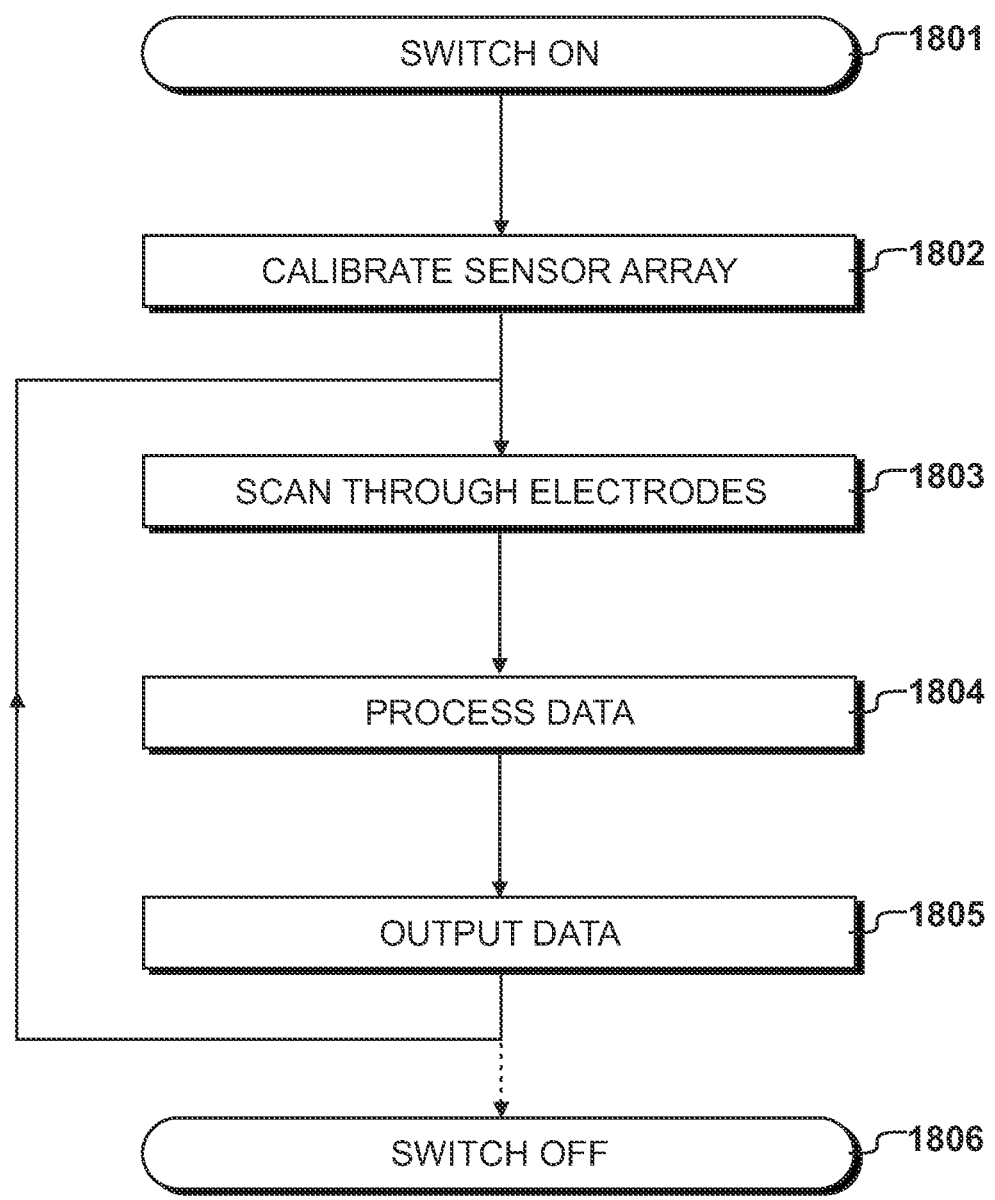
FIG. 18 details steps carried out to operate the sensing apparatus shown in FIG. 1 using the sensor array embodiment shown in FIG. 13.

Steps carried out to operate the second embodiment of sensing apparatus 105 are detailed in FIG. 18. A sensor pad including sensor array 1300 has been attached to an object and is attached to control unit 107.

At step 1801, the control unit 107 is switched on, and at step 1802 a calibration procedure is run. The calibration procedure is a scan of the sensor array (as will be described further below) carried out in normal atmospheric pressure and serves to establish reference values for capacitive coupling between transmitter and receiver electrodes. Once the calibration procedure has been run, the object may be moved, subjected to wind, etc. in order to gain air pressure measurements.

At step 1803, sensor array 1300 is scanned by cycling through the transmitter, receiver, and ground electrodes, in order to activate each individual transmitter-receiver pair in sequence. This procedure will be described further with reference to FIG. 19. At step 1804, the responses produced by the receiver electrodes are processed with respect to the reference values produced at step 1802, and outputted at step 1805 for display, storage, or further analysis. Control then returns to step 1803 where the array is scanned again, or alternatively the sensor is switched off at step 1806. Typically, scanning would continue all the time the object is moving or being subjected to wind.

FIG. 19

Figure 19:
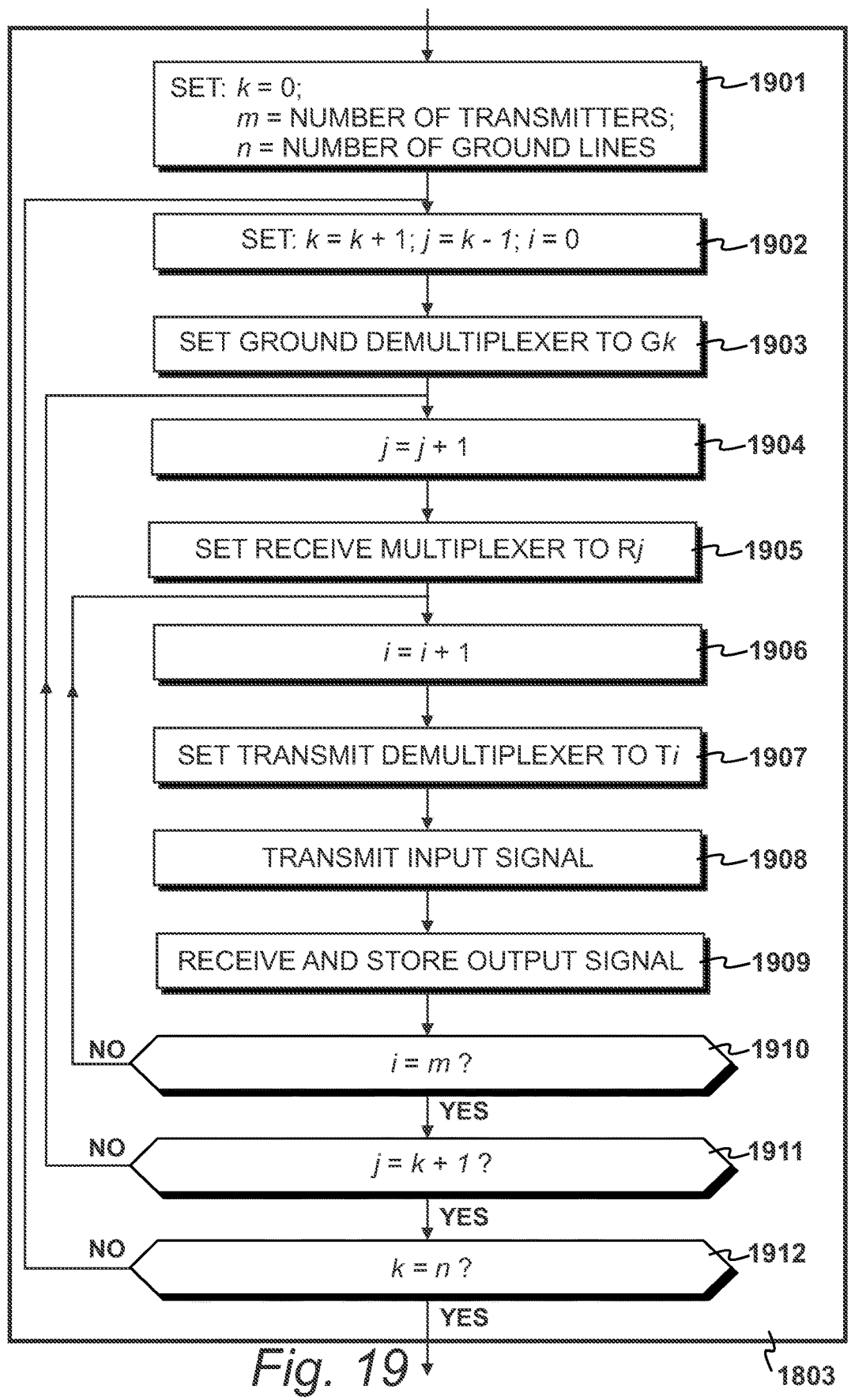
FIG. 19 details steps carried out during FIG. 18 to scan the sensor array shown in FIG. 13.

Steps carried out at step 1803 to scan sensor array 1300 by switching between the outputs of transmitter demultiplexer 205 and ground demultiplexer 207, and the inputs of receiver multiplexer 206, are detailed in FIG. 19. In this embodiment, the multiplexers are connected to the electrodes in sensor array 1300.

The sensor array 1300 is scanned in a different way from sensor array 201, because each transmitter-receiver pair affects four cells, and therefore four sensors. The scan method is as follows. First a ground electrode is selected, and then an adjacent receiver electrode, as shown in FIG. 17. With this ground electrode grounded and this receiver electrode set to receive, all of the transmitter electrodes are activated in turn, creating a set of responses from the selected receiver electrode. Following this, the other receiver electrode adjacent to the ground electrode is selected, and then all the transmitter electrodes are activated again. This is carried out for each ground electrode in turn. By this method, for each ground electrode, all the transmit-receive pairs forming a cell beneath that electrode are cycled through. This means that in total each transmit-receive pair is activated twice, except the ones at the edges which are only activated once. Further, each response from a transmit-receive pair is relevant to two cells, as was described with reference to FIG. 17. Thus, there are stored four times as many response values as there are sensors, one value for each corner of each sensor.

At step 1901, an iterative variable k is set to equal 0. Constants m and n are set to be the number of transmitter electrodes and the number of ground electrodes respectively. In this embodiment, there is one fewer ground electrode than the number of receiver electrodes, and each ground electrodes is above a row of cells. Thus, in this embodiment, the processor cycles through the ground electrodes, then the adjacent receiver electrodes, then all the transmitter electrodes. However, in other embodiments, the ground electrodes could be grouped differently and therefore the scanning process would vary accordingly.

At step 1902, the variable k is set to equal k+1, an iterative variable j is set to be equal to k, and an iterative variable i is set to equal zero. At step 1903, ground demultiplexer 207 is set to connect the kth output to ground, so in the first case, the first output. At step 1904, the variable j is set to equal j+1, and at step 1905 receiver multiplexer 206 is set to receive on the jth input; so, on the first iteration of this step for a value of k, the kth input. At step 1906 the variable i is set to equal i+1, and at step 1907 transmitter demultiplexer 205 is set to output on the ith output; so, in the first case, the first output. At step 1908, signal generator 203 produces an input signal which is transmitted on the selected transmitter electrode. At step 1909 signal detector 204 receives an output signal from the selected receiver electrode, which is stored in memory 302 for processing at step 1804.

At step 1910, a question is asked as to whether variable i is equal to m. If this question is answered in the negative, then control returns to step 1906 where i is incremented before an input signal is transmitted on the next transmitter electrode. If the question asked at step 1910 is answered in the affirmative, then a further question is asked at step 1911 as to whether the variable j is equal to k+1. If this question as answered in the negative, the control returns to step 1904 where j is iterated and the next receiver electrode is selected. If the question asked at step 1911 is answered in the affirmative, then a further question is asked at step 1912 as to whether the variable k is equal to n. If this question is answered in the negative, then control returns to step 1902 where k is iterated and the next ground electrode is selected.

If the question asked at step 1912 is answered in the affirmative, then step 1803 is complete.

As described with reference to the first embodiment, the processing method described is suitable to the specific layout of ground electrodes and the configuration of grounding one electrode at once. However, the electrodes may be laid out differently, and many user configurations may be available, in which case the method of scanning would vary.

FIG. 20

Figure 20:
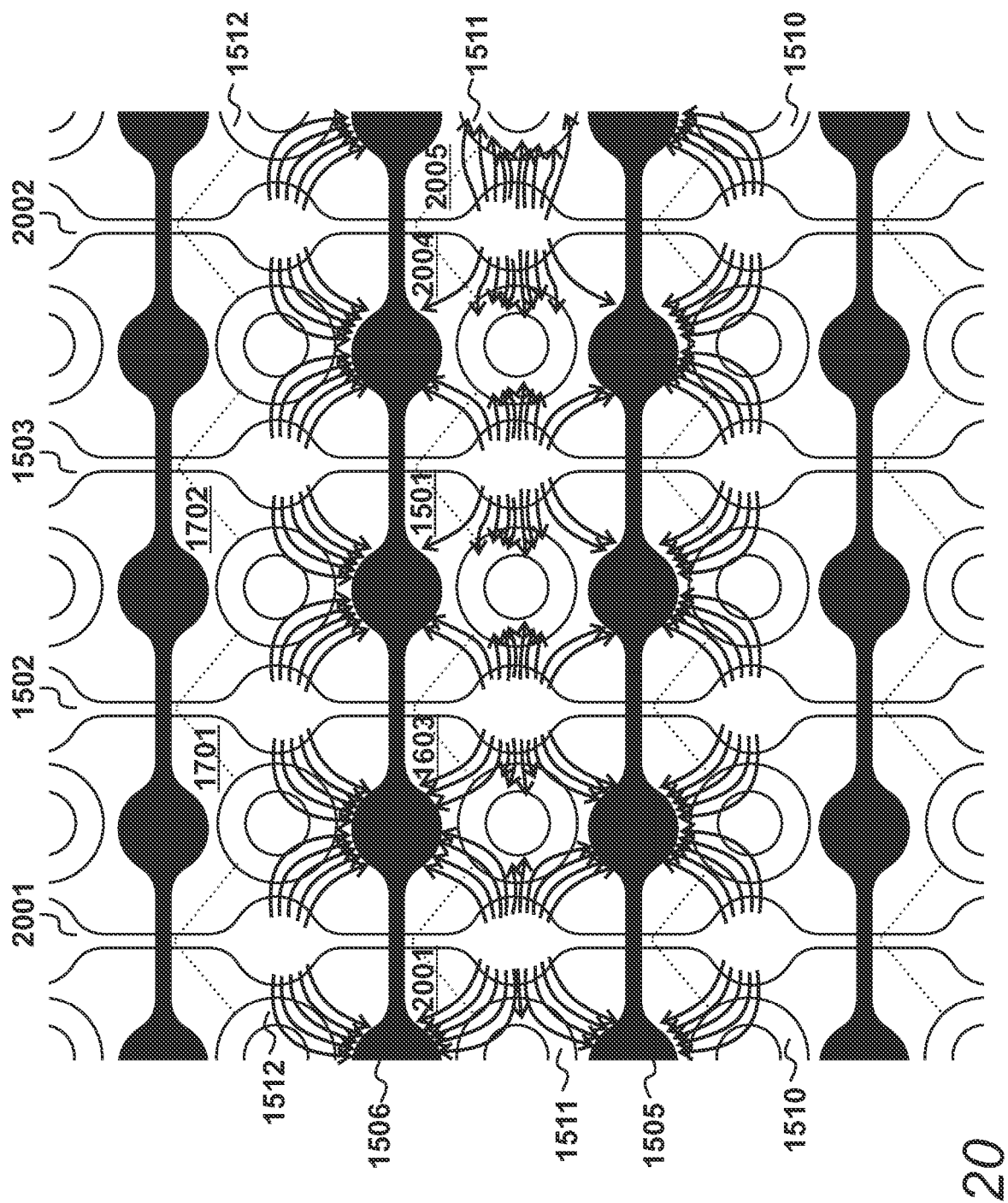
FIG. 20 illustrates the electrical field produced during the steps taken in FIG. 19.

FIG. 20 illustrates the partial sensor array 1300 of FIG. 17, but showing multiple flux arrows caused by the scanning process described with reference to FIG. 18. In practice, these electrical fields do not occur simultaneously, but they are shown here on a single drawing.

In this example the sensor pad comprising array 1300 is attached to a moving object, and therefore changes in air pressure are being measured. The scanning has proceeded as follows. First, ground electrode 1511 was grounded, then receiver electrode 1506 was set to receive. Transmitter electrodes 2001, 1502, 1503, and 2002 were activated in turn, and four response values were received from receiver electrode 1506 and stored. Following this, receiver electrode 1505 was set to receive, and again the four transmitter electrodes were activated in turn, and four response values were received from receiver electrode 1505 and stored.

Because ground electrodes 1512 and 1510 were open, the electrical field in the cells underneath these electrodes all occurred between the relevant transmitter and receiver electrode pairs. However, in the cells underneath grounded electrode 1511—cells 2001, 1603, 1501, 2004, and 2005, capacitive coupling occurred between the relevant transmitter electrodes and ground electrode 1511, varying according to the distance between the membrane 1308 and the electrically active layer 1301. This correspondingly affected the response values received from receiver electrodes 1506 and 1505.

However, it can be seen that for each of the active sensors, the electrical field is not even across the cell. As was shown in FIG. 8, the membrane 1308 may be lifted or pushed unevenly by the direction of the wind, leading to the relevant portion of ground electrode 1511 being closer or further away from each transmitter-receiver electrode pair. Thus in each corner of each cell, the electrical field may be slightly different. For this reason, a response value is stored for each corner, allowing not only an overall air pressure measurement for the sensor to be provided, but also an indication of the direction of the wind affecting the sensor.

However, each response value output by a receiver electrode represents the capacitive coupling in all four affected cells. As has previously been described, the response created in the cells that are not underneath a grounded electrode will be cancelled out using the reference value. The remaining difference between the response value and the reference value will be the average difference between the two adjacent active cells under the grounded electrode. However, as long as the resolution of the sensor array is fine enough, this will be acceptably accurate.

FIG. 21

Figure 21:
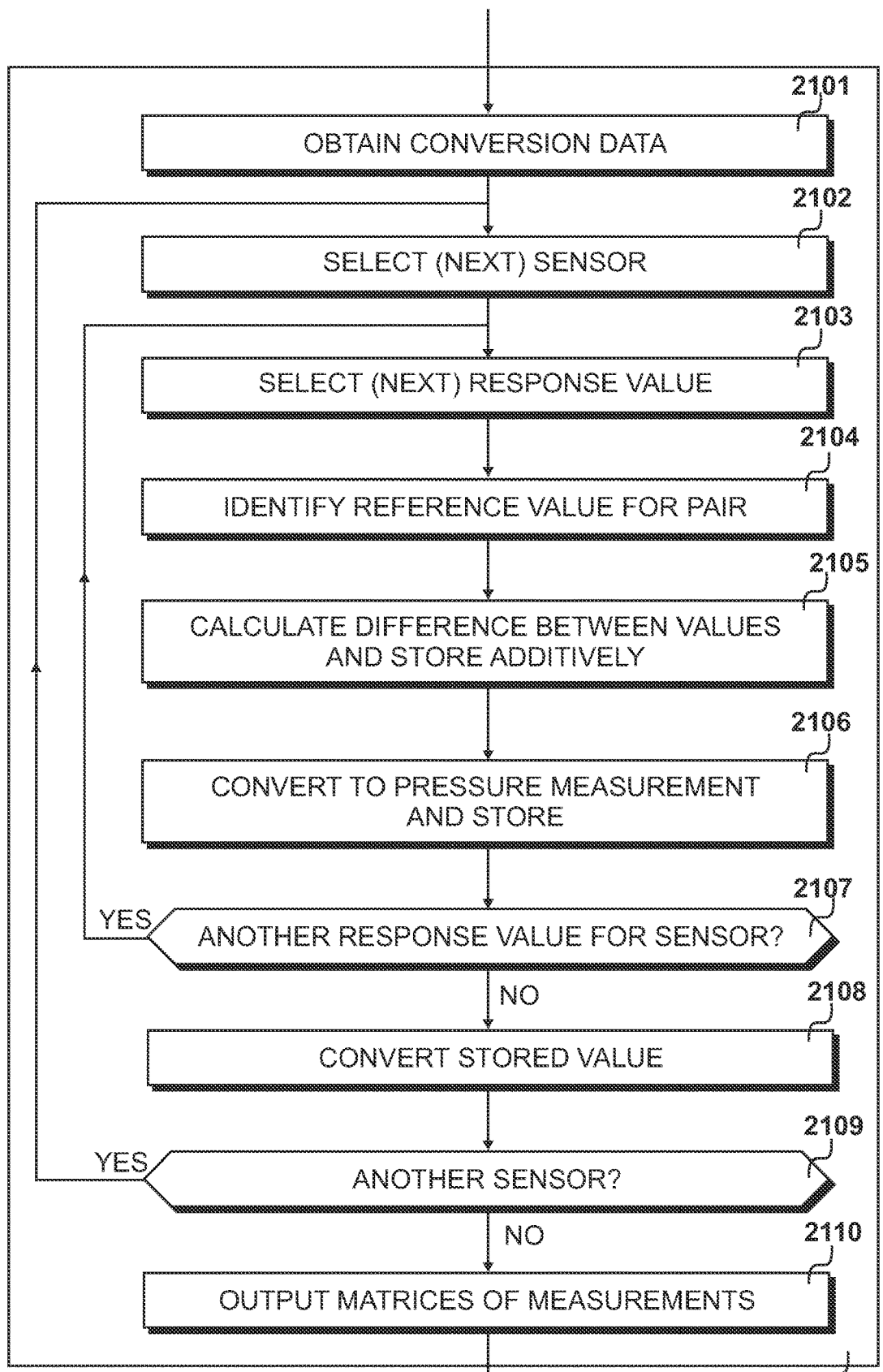
FIG. 21 details steps carried out during FIG. 18 to process response data.

FIG. 21 details step 1804, at which the responses produced by sensor array 1300 are processed. In practice, step 1804 is likely to be run as a concurrent thread with step 1803 in order to maximise processing efficiency. Responses are received sequentially from each sensor, and each response can be associated with its corresponding transmitter-receiver pair in order to identify the sensor.

At step 2101 conversion data is obtained, suitable for the configuration chosen by the user. This is created in the same way as was described with respect to FIG. 11.

At step 2102 a sensor is selected. The order in which they are selected is not important. At step 2103 one of the four response values associated with the sensor is selected, and at step 2104 the reference value, obtained during the calibration process at step 1802, for the transmitter-receiver pair that produced the response value is identified. At step 2105 the difference between the response value and the reference value is calculated and stored. The calculated value represents the difference in capacitive coupling between the reference value obtained during the calibration process and the response value obtained at the time of scanning. As an alternative, this value could be calculated at the time of scanning, during step 1803. The calculated value is stored additively, so that it is added to any previous calculated value for that sensor. At step 2106 the calculated value is converted to a pressure measurement, which is stored.

At step 2107 a question is asked as to whether there is another response value for the selected sensor, and if this question is answered in the affirmative then control returns to step 2103 and the next response value is selected. Alternatively, the question is answered in the negative meaning that all four values have been processed. Thus, there currently exists four stored pressure measurement values, and a cumulative value representing the sum of all four calculated differences. Thus, at step 2108 this stored cumulative value is converted to a pressure measurement and stored.

At step 2109 a question is asked as to whether there is another sensor to be processed within the current scan. If this question is answered in the affirmative then control is returned to step 2102 and the next sensor is selected. Alternatively, if the processing is complete, then at step 2110, matrices of air pressure measurements are output, either to storage or to display. One matrix contains an air pressure measurement for each sensor, and the other contains four air pressure measurements per sensor.

The output may be either via I/O 313, or to storage 314 for later output to an external unit. If the output is immediate, then the measurements may be displayed or stored by an external computer. In alternative embodiments, the air pressure measurements could be output sequentially as they are produced, rather than being stored and output as a matrix. It is also possible for the user to configure the sensing apparatus 105 to only output values for a particular set of sensors in sensor pad 106. If this option has been selected, then the processor may skip the unwanted response values during step 904, or it may skip certain transmitter electrodes and receiver electrodes during the scan of step 903.

Alternative methods of combining the four corner measurements could be used. For example, the air pressure measurement for the sensor could simply be considered as an average of the four corner air pressure measurements, meaning that it is only the corner values that need to be output.

FIG. 22

Figure 22:
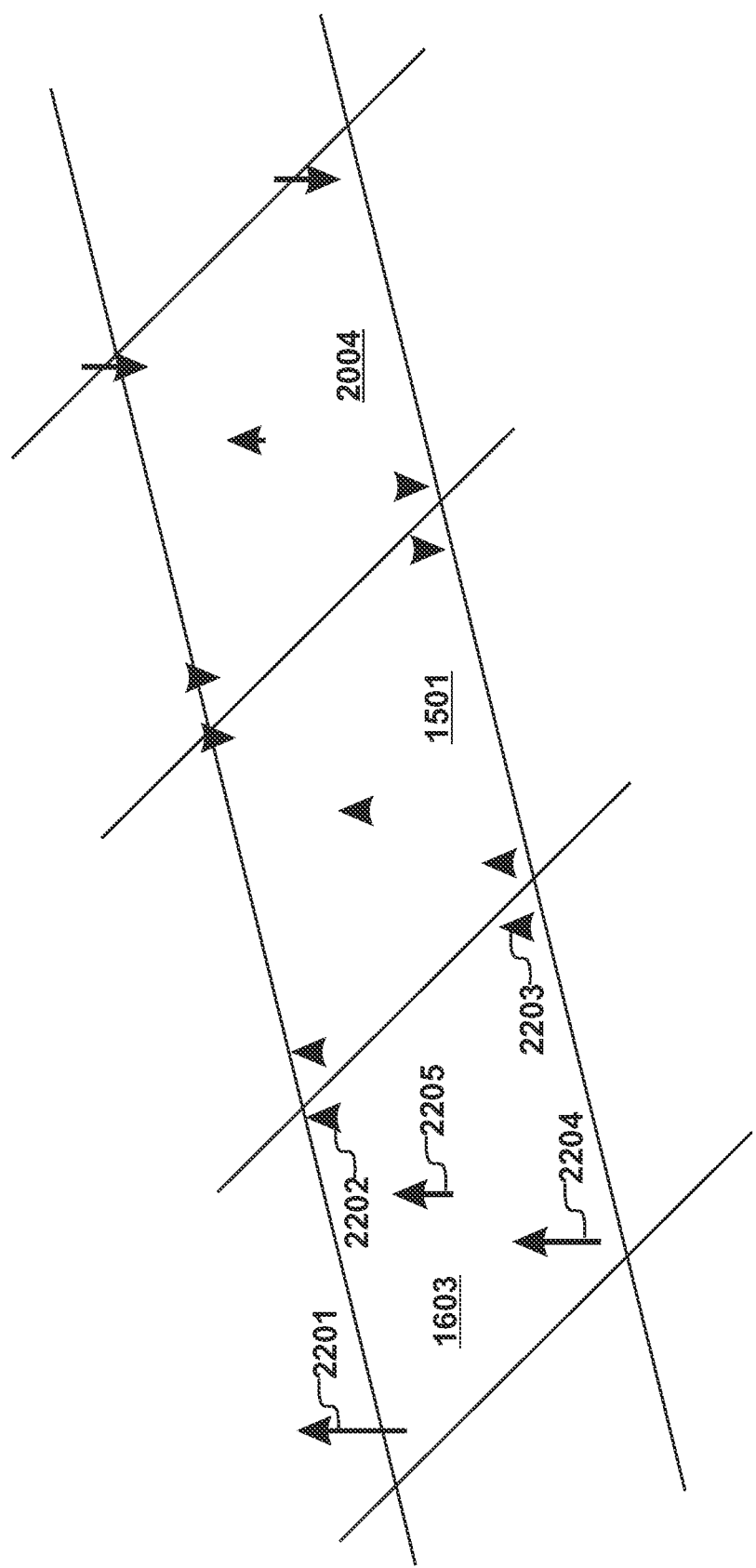
FIG. 22 illustrates an example of response data processed during FIG. 21.

FIG. 22 illustrates the top of a sensor pad including sensor array 1300, showing only the sensors 1603, 1501, and 2004. These are the sensors illustrated in FIG. 20 as having all four corner response values. No electrodes are shown here for clarity, although in the actual sensor pad the ground electrodes could be visible.

The arrows shown on the sensors are representations of the measurements taken by the sensors. For example, for sensor 1603, arrow 2201 is the top left corner measurement, arrow 2202 is the top right corner measurement, arrow 2203 is the bottom right corner measurement, and arrow 2204 is the bottom left corner measurement. Arrow 2205 shows the overall sensor measurement. The corner measurements show that the low air pressure is greater at the top left corner (arrow 2201) than at the other corners, showing that the direction in which the low air pressure is pulling membrane 1308 is towards the bottom right corner.

Similarly, considering sensor 2204, the high air pressure measurements on the right side are greater than those on the left side, showing that the direction in which the high air pressure is pushing membrane 1308 is towards the right side.

Thus, this embodiment of the air pressure sensing apparatus can not only sense air pressure on each sensor but can also provide data that can be used to display the direction of the wind caused by the changes in air pressure.

This can alternatively be considered as sensing the orientation of the top layer of the sensor relative to the electrically active layer. In this embodiment, the orientation indicates the direction of the air pressure on the sensor. However, in other discussed embodiments, the orientation indicates other aspects of the sensor, such as whether a push on the top layer is central to the sensor.

The invention claimed is:
1. An apparatus comprising:
an electrically active layer having a first plurality of substantially parallel electrodes and a second plurality of substantially parallel electrodes, wherein said first plurality of substantially parallel electrodes are not parallel to said second plurality of substantially parallel electrodes, such that there exists a matrix of intersection points between said first plurality of substantially parallel electrodes and said second plurality of substantially parallel electrodes;

a signal generator configured to generate excitation signals and connected to said first plurality of substantially parallel electrodes;

a signal detector configured to detect output signals from said second plurality of substantially parallel electrodes, wherein an output signal from one of said second plurality of substantially parallel electrodes is indicative of a degree of capacitive coupling to one of said first plurality of substantially parallel electrodes on application of an excitation signal thereto; and a flexible top layer sealed to said electrically active layer to define at least one hermetic void between portions of said flexible top layer and portions of said electrically active layer;

such that at least one sensor is defined, each sensor of said at least one sensor containing only one of said hermetic voids and comprising a moveable layer and a fixed layer, being respectively said portion of said flexible top layer and said portion of said electrically active layer that define said hermetic void;

wherein for each sensor:
said fixed layer comprises one of said intersection points;
at least a part of said moveable layer is configured to be selectively grounded; and
while said part of said moveable layer is grounded, a degree of capacitive coupling between a pair of electrodes that intersect at said intersection point is indicative of movement of said part of said moveable layer towards or away from said fixed layer.

2. The apparatus according to claim 1, further comprising a spacer layer defining at least one aperture, said spacer layer being sealed between said flexible top layer and said electrically active layer, such that each said hermetic void is defined by one of said apertures.

3. The apparatus of claim 1, further comprising a processor and memory, wherein said processor sends control signals to said signal generator and receives responses from said signal detector, and is configured to:
obtain a measurement of capacitive coupling for said sensor by:
setting said part of said moveable layer to be grounded,
sending a control signal to said signal generator such that capacitive coupling occurs between said pair of electrodes, and
receiving a response from said signal detector; and
compare said measurement with a reference value stored in said memory, to determine a calculated difference value representing said movement of said moveable layer.

4. The apparatus of claim 3, wherein said processor is further configured to convert said calculated difference value to a pressure measurement indicative of a positive pressure or a negative pressure applied to said moveable layer.

5. The apparatus of claim 3, wherein said reference value is obtained by obtaining a measurement of capacitive coupling while said moveable layer is at a known distance from said fixed layer.

6. The apparatus of claim 1, wherein:
each said intersection point comprises a first circle defined by a first electrode, and a second, smaller, circle defined by a second electrode, and said second, smaller, circle is within said first circle; and
for each sensor, a whole of an intersection point is within its hermetic void.

7. The apparatus of claim 1, wherein:
said flexible top layer comprises a third plurality of electrodes each of which may be connected to ground; and
each electrode of said third plurality of electrodes is connected to a controller such that for each electrode of said third plurality of electrodes, its state is changeable between grounded and another state.

8. An apparatus comprising:
an electrically active layer having a first plurality of substantially parallel electrodes and a second plurality of substantially parallel electrodes, wherein said first plurality of substantially parallel electrodes are not parallel to said second plurality of substantially parallel electrodes, such that there exists a matrix of intersection points between said first plurality of substantially parallel electrodes and said second plurality of substantially parallel electrodes;

a signal generator configured to generate excitation signals and connected to said first plurality of substantially parallel electrodes;

a signal detector configured to detect output signals from said second plurality of substantially parallel electrodes, wherein an output signal from one of said second plurality of substantially parallel electrodes is indicative of a degree of capacitive coupling to one of said first plurality of substantially parallel electrodes on application of an excitation signal thereto; and a flexible top layer sealed to said electrically active layer to define at least one hermetic void between portions of said flexible top layer and portions of said electrically active layer;

such that at least one sensor is defined, each sensor of said at least one sensor containing only one of said hermetic voids and comprising a moveable layer and a fixed layer, being respectively said portion of said flexible top layer and said portion of said electrically active layer that define said hermetic void;

wherein for each sensor:
said fixed layer comprises an area that is in a cell bounded by a plurality of said intersection points;
at least a part of said moveable layer is configured to be selectively grounded; and
while said part of said moveable layer is grounded, a degree of capacitive coupling between pairs of intersecting electrodes bounding said area is indicative of movement of said part of said moveable layer towards or away from said fixed layer.

9. The apparatus according to claim 8, further comprising a spacer layer defining at least one aperture, said spacer layer being sealed between said flexible top layer and said electrically active layer, such that each said hermetic void is defined by one of said apertures.

10. The apparatus according to claim 8, further comprising a processor and memory, wherein said processor sends control signals to said signal generator and receives responses from said signal detector, and is configured to:
obtain a plurality of measurements of capacitive coupling for said sensor by:
setting said part of said fixed layer to be grounded,
sending control signals to said signal generator such that capacitive coupling occurs in sequence between said pairs of intersecting electrodes, and
receiving responses from said signal detector; and comparing said measurements with reference values stored in said memory, to determine a calculated difference value representing said movement of said moveable layer.

11. The apparatus according to claim 10, wherein said step of comparing said measurements with reference values comprises the steps of:
   comparing each said measurement with a reference value for a respective pair of electrodes to determine a difference value for said respective pair of electrodes, and
   combining said difference values to determine said calculated difference value.

12. The apparatus according to claim 10, wherein said processor is further configured to compare said measurements, or values derived from said measurements, with each other to determine an orientation of said moveable layer with respect to said fixed layer.

13. The apparatus according to claim 10, wherein said processor is further configured to convert measurements of said movement of said flexible top layer to at least one pressure measurement indicative of a positive pressure or a negative pressure applied to said grounded part of said flexible top layer overlaying said area.

14. The apparatus according to claim 8, wherein each of said first plurality of substantially parallel electrodes and said second plurality of substantially parallel electrodes is thinner at said intersection points than at other places.

15. In an apparatus comprising an electrically active layer having a first plurality of substantially parallel electrodes and a second plurality of substantially parallel electrodes, a method comprising the steps of:
   generating an excitation signal and applying it to a first electrode, being one of said first plurality of substantially parallel electrodes;
   detecting an output signal from a second electrode, being one of said second plurality of substantially parallel electrodes, and said output signal being indicative of a degree of capacitive coupling to said first electrode on application of said excitation signal,
   wherein:
      said first plurality of substantially parallel electrodes are not parallel to said second plurality of substantially parallel electrodes, such that there exists a matrix of intersection points between said first plurality of substantially parallel electrodes and said second plurality of substantially parallel electrodes, and
      a flexible top layer is attached to said electrically active layer to define a hermetic void covering an area, wherein said area contains said intersection point of a pair of electrodes, and said flexible top layer is grounded in at least a part of said flexible top layer that overlays said area; and
   using said output signal, calculating an amount of movement of said flexible top layer towards or away from said electrically active layer.

16. The method according to claim 15, wherein said step of calculating said amount of movement comprises the steps of:
   setting said part of said flexible top layer to be grounded;
   sending a control signal to a signal generator such that capacitive coupling occurs between said pair of electrodes;
   receiving a response from a signal detector; and
   comparing a measurement obtained from said response with a reference value stored in memory, to determine a calculated difference value representing said movement of said flexible top layer.

17. In an apparatus comprising an electrically active layer having a first plurality of substantially parallel electrodes and a second plurality of substantially parallel electrodes, a method comprising the steps of:
   generating an excitation signal and applying it to a first electrode, being one of said first plurality of substantially parallel electrodes;
   detecting an output signal from a second electrode, being one of said second plurality of substantially parallel electrodes, and said output signal being indicative of a degree of capacitive coupling to said first electrode on application of said excitation signal,
   wherein:
      said first plurality of substantially parallel electrodes are not parallel to said second plurality of substantially parallel electrodes, such that there exists a matrix of intersection points between said first plurality of substantially parallel electrodes and said second plurality of substantially parallel electrodes, and
      a flexible top layer is attached to said electrically active layer to define a hermetic void covering an area, wherein said area is in a cell bounded by a plurality of said intersection points, and said flexible top layer is grounded in at least a part of said flexible top layer that overlays said area; and
   using said output signal, calculating an amount of movement of said flexible top layer towards or away from said electrically active layer.

18. The method according to claim 17, wherein:
   excitation signals are applied in sequence to transmitter electrodes in each pair of electrodes defining an intersection point bounding said cell; and
   said step of calculating said amount of said movement comprises the steps of:
      obtaining a plurality of measurements by measuring said capacitive coupling at each corresponding receiver electrode, and
      using said measurements to determine said amount of movement.

19. The method according to claim 18, wherein said step of using said measurements to determine said amount of movement comprises the steps of:
   obtaining a plurality of difference values by, for each measurement, comparing said measurement with a reference value for a corresponding pair of first and second electrodes, and
   combining said plurality of difference values.

20. The method according to claim 18, further comprising the step of comparing said measurements, or values derived from said measurements, with each other to determine an orientation of said flexible top layer with respect to said electrically active layer.

* * * * *